US006381365B2

(12) United States Patent
Murakawa

(10) Patent No.: US 6,381,365 B2
(45) Date of Patent: Apr. 30, 2002

(54) IMAGE DATA PROCESSING APPARATUS AND IMAGE DATA PROCESSING METHOD

(75) Inventor: Akira Murakawa, Kobe (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/137,234

(22) Filed: Aug. 20, 1998

(30) Foreign Application Priority Data

Aug. 22, 1997 (JP) ............................................. 9-226101
Sep. 1, 1997 (JP) ............................................. 9-235979

(51) Int. Cl.[7] ............................ G06K 9/46; G06K 9/68; G03F 3/08
(52) U.S. Cl. ........................ 382/190; 382/218; 358/521
(58) Field of Search .................................. 382/190, 181, 382/209, 217, 218, 173, 170, 100; 358/521, 522

(56) References Cited

U.S. PATENT DOCUMENTS

| | | | | |
|---|---|---|---|---|
| 5,085,517 A | * | 2/1992 | Chadwick et al. | 356/394 |
| 5,513,275 A | * | 4/1996 | Khalaj et al. | 382/149 |
| 5,533,148 A | * | 7/1996 | Sayah et al. | 382/240 |
| 5,574,886 A | * | 11/1996 | Koike et al. | 703/1 |
| 5,668,897 A | * | 9/1997 | Stolfo | 382/283 |
| 5,734,747 A | * | 3/1998 | Vaidyanathan | 382/170 |
| 5,859,930 A | * | 1/1999 | Chase | 382/218 |
| 5,887,080 A | * | 3/1999 | Tsubusaki et al. | 382/172 |
| 6,222,932 B1 | * | 4/2001 | Rao et al. | 382/100 |

FOREIGN PATENT DOCUMENTS

| | | |
|---|---|---|
| JP | 60-157681 | 8/1985 |
| JP | 5-28266 | 2/1993 |
| JP | 5-274372 | 10/1993 |
| JP | 6-274193 | 9/1994 |
| JP | 6-295318 | 10/1994 |
| JP | 7-271949 | 10/1995 |
| JP | 8-16789 | 1/1996 |
| JP | 8-329096 | 12/1996 |

OTHER PUBLICATIONS

Dr. Gupta, "Visual Information Retrieval Technology A Virage Perspective", Virage Image Engine API Specification, Feb. 1997, pp. 1–10.

* cited by examiner

Primary Examiner—Amelia M. Au
Assistant Examiner—Mehrdad Dastouri
(74) Attorney, Agent, or Firm—Burns, Doane, Swecker & Mathis, LLP

(57) ABSTRACT

An image data processing apparatus for extracting a basic texture pattern as an identifiable feature of an image so that accurate image search can be performed by comparing images using the extracted basic texture patterns. The image data processing apparatus inputs image, detects textural periodicity in the image, extracts the basic texture pattern based on the calculated periodicity, normalizes the extracted basic pattern and shifts the normalized basic pattern. The apparatus stores the normalized and shifted basic pattern to an image database with the image from which the basic pattern was extracted.

33 Claims, 22 Drawing Sheets

Fig.3

50 IMAGE DATA BASE

| IMAGE DATA | KEYWORD | FEATURE VALUE 1 | FEATURE VALUE 2 | ...... |
|---|---|---|---|---|
| DATA A | KEYWORD 1 | $(d_1, \theta_1)$ | $(d_2, \theta_2)$ | |
| DATA B | KEYWORD 2 | $(d_1', \theta_1')$ | $(d_2', \theta_2')$ | |
| ⋮ | ⋮ | ⋮ | ⋮ | ⋮ |
| | | | | |

$\theta = 0°$ $\theta = 45°$ $\theta = 90°$ $\theta = 135°$

Fig. 13

| IMAGE DATA | KEYWORD | FEATURE VALUE 1 | | FEATURE VALUE 2 | ... |
|---|---|---|---|---|---|
| | | PERIOD 1 | PERIOD 2 | | |
| | | | | PATTERN | |
| DATA A | KEYWORD 1 | $(d_1, \theta_1)$ | $(d_2, \theta_2)$ | PATTERN 1 / SHAPE 1 | ...... |
| DATA B | KEYWORD 2 | $(d_1', \theta_1')$ | $(d_2', \theta_2')$ | PATTERN 1' / SHAPE 2 | ...... |
| ...... | | | | ...... | |

50 IMAGE DATA BASE

WHEN A NORMALIZED SIZE IS EVEN

WHEN A NORMALIZED SIZE IS ODD

COMPARISON / SEARCH RESULT

IMAGE DATA PROCESSING APPARATUS AND IMAGE DATA PROCESSING METHOD

This application is based on patent application Nos. 9-226101 and 9-235979 filed in Japan, the content of which is incorporated hereinto by reference.

BACKGROUND OF THE INVENTION

1. Field of the Invention

The present invention relates to an image processing apparatus and image processing method for extracting features from an image, and relates more specifically to an apparatus and method for extracting the textural features of an image.

2. Description of the Related Art

Image databases typically contain various attributes and search information for each image in the database. Attributes typically include, for example, the original image production date, revision date, file name, and file format. Search information typically includes, in addition to the attributes, keywords and feature information such as shapes, colors, and even audio information. The attributes are often attached automatically to a new image when the image is registered into the database. Features such as texture, color, and edge information can also be automatically extracted from the image and added to the database. The problem with the feature extraction is the processing time required to extract the features from the images. This is a particular problem with textural features because of the number of operations required.

There has therefore been a need for a method of efficiently extracting image features, and particularly textural features, from image information.

Japanese Patent Laid-Open Publication No. 5-28266 teaches a method for extracting texture features from an image by segmenting an image into square blocks and then extracting feature information from each block. This method, however, divides the entire image into the blocks from which features are then extracted, and thus processes the entire image. The taught method is thus not an efficient means of extracting features from images having a uniform texture pattern throughout. This method also does not extract structural information about texture patterns.

Also the method of extracting information about texture structure is disclosed in, for example, "Basics of image recognition II: feature extraction, edge detection, and texture analysis (in Japanese, by Mori Shunji et al.; Ohmsha)". This teaches a method for extracting the basic pattern and arrangement of pattern elements creating a particular image texture using a rigid processing method, but the process is complicated and is not practical in terms of the required processing speed.

Image feature extraction is normally applied to image data after image normalization, gray scale conversion, and digitizing have been completed. The threshold values used for digitizing images are normally set to a median value at which pixel "0" and pixel "1" appear with same probabilities in pixel distribution, or to the average brightness level of the image. Because this often results in the threshold value being set to the pixel value of image areas having a gradual tonal change and occupying a large area of the image, the final digital image tends to look unnatural when the image has a substantially uniform background such as blue sky or other solid color image. The problem is, more specifically, that when digitizing images with sky or basically solid color background, parts of the background are converted to pixel "0" and other parts are converted to pixel "1" even though there is no change in the background, resulting in an unnatural appearance. When the resulting digital image data is then used for feature extraction, image features cannot be appropriately extracted.

There is therefore a need for a means and method whereby texture features can be extracted from an image efficiently and accurately.

There is a further need for a means and method whereby image searching can be performed with good precision by extracting the basic texture pattern of an image as a feature of the image, and comparing images using these detected basic texture patterns.

SUMMARY OF THE INVENTION

An object of the present invention is therefore to provide an image data processing apparatus and method for efficiently and accurately extracting texture features from images.

A further object of the invention is to provide an image data processing apparatus and method for searching image data by extracting feature information relating to basic image texture patterns, and comparing extracted patterns to determine image content.

In an aspect of this invention, an image data processing apparatus according to an exemplary embodiment of the present invention addresses particularly detecting texture features from image data by means of a texture extraction controller, a memory and a comparison controller.

The texture extraction controller obtains feature information relating to said image texture based on the image data. The memory stores image data and the associated feature information extracted from the image data by the texture extraction controller with a defined correlation between the stored image data and feature information so that the comparison controller can seek images in memory by comparing images based on the feature information stored to memory.

In another aspect of this invention, an image data processing apparatus processes image data for images containing a texture formed by a basic pattern repeating at a specific period by means of a detection controller, a memory and a comparison controller. The detection controller detects feature information relating to the basic pattern of the image texture and the arrangement of basic pattern elements based on source image data. The memory stores image data and the associated feature information detected by the detection controller with a defined correlation between the stored image data and feature information so that the comparison controller can compare images based on the stored feature information.

In another aspect of this invention, an image data processing apparatus processes the image data for images containing a texture pattern formed by a basic pattern repeating at a specific period, and comprises an image database, an input means, and a comparison and searching controller. The image database stores image data for a plurality of images, and feature information describing a basic pattern and period of a texture in an associated stored image. The relationship between image data and associated feature information is defined such that a particular image can be found by referencing the associated feature information. The input means enables a user to select an image to be used as a search key whereby the image data processing apparatus seeks a desired image data from the image database. The comparison and search controller seeks a desired image from the image database by sequentially comparing feature information for the image selected as a search key with feature information stored in the image database, and determines any similarity between the search key and compared image.

In further aspect of this invention, an image data processing apparatus processes image data for a pixel image wherein a plurality of pixels are arranged in a matrix pattern and the pixel image has a texture pattern. To process the image data, this image data processing apparatus uses an extraction controller for extracting feature information descriptive of an image texture using pixel data for pixels located in a scanning band oriented in a specific direction through the image. The scanning band can be a line or a band of a specific width.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which:

FIG. 3 is a conceptual illustration of a typical image database structure;

FIG. 13 is a conceptual illustration of a typical image database structure in a second embodiment of the invention;

DESCRIPTION OF THE PREFERRED EMBODIMENTS

The preferred embodiments of an image data processing apparatus according to the present invention are described below with reference to the accompanying figures.

Figure 22:
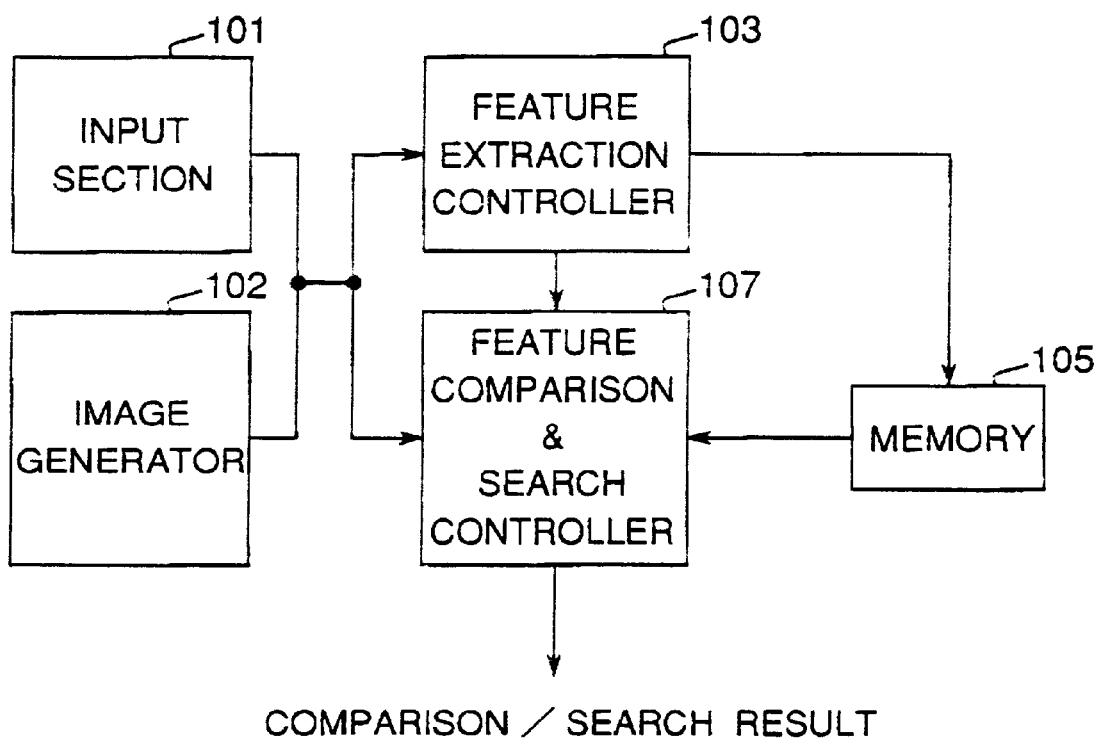
FIG. 22 is a block diagram representative of a concept of an image data processing apparatus according to the invention.

FIG. 22 shows a block diagram representative of a concept of an image processing apparatus of the invention. The image processing apparatus comprises an input section 101, an image generator 102, a feature extraction controller 103, a memory 105 and a feature comparison and search controller 107.

The input section 101 inputs the image data as a search-key according to a user operation. The image generator 102 generates the image data as a search-key. The memory 105 stores image data with the feature information related to the image data. The feature extraction controller 103 extracts a feature from the image inputted by the input section 101 or generated by the image generator 102 based on a texture of the image and registers the extracted feature with the original image to the memory 105. The feature comparison and search controller 107 compares images based on the texture feature and searches an image similar to the search-key from images stored in the memory 105 based on the feature information stored in the memory 105.

In this invention, the feature information is related to texture information, for example, periodicity of the image comprising basic patterns of the texture and arrangement information about the patterns.

Figure 23:
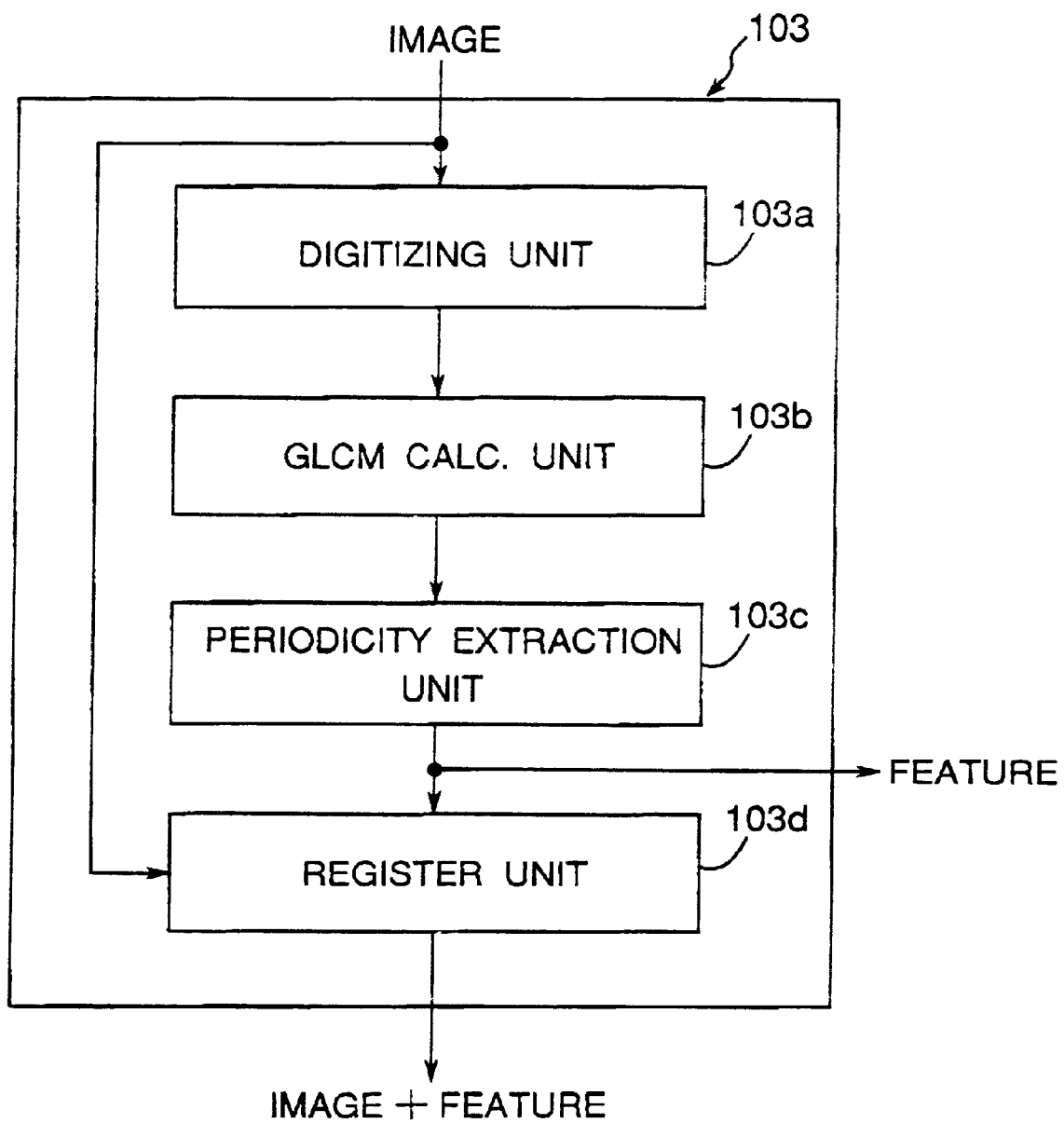
FIG. 23 is a block diagram representative of a concept of a feature extraction controller shown in FIG. 22.

FIG. 23 shows a block diagram representative of a concept of the feature extraction controller 103. The feature extraction controller 103 comprises a digitizing unit 103a, a GLCM calculation unit 103b, a periodicity extraction unit 103c and a register unit 103d.

The digitizing unit 103a digitizes the inputted image. Specifically, the digitizing unit 103a sets a threshold for digitizing the image to a value shifted by a predetermined value from a median value in a pixel distribution of the image. The GLCM calculation unit 103b calculates a GLCM (Gray Level Co-occurrence Matrix) of the image digitized by the digitizing unit 103a. The periodicity extraction unit 103c extracts a periodicity as the feature information of the image using the GLCM calculated by the GLCM calculation unit 103b. The periodicity is extracted in two directions. The register unit 103d registers the feature information extracted by the periodicity extraction unit 103c with the original image to the memory 105.

Embodiments of the image data processing apparatus with the above concept will be described bellow.

(Embodiment 1)

An image data processing apparatus according to the present invention improves the efficiency of the feature extraction process by scanning and extracting image features from a particular area of the overall image rather than scanning the entire image when extracting texture features. The area scanned for texture feature extraction is a band-shaped region of a predetermined width. Texture features are extracted from the image within this scanning band.

Figure 1:
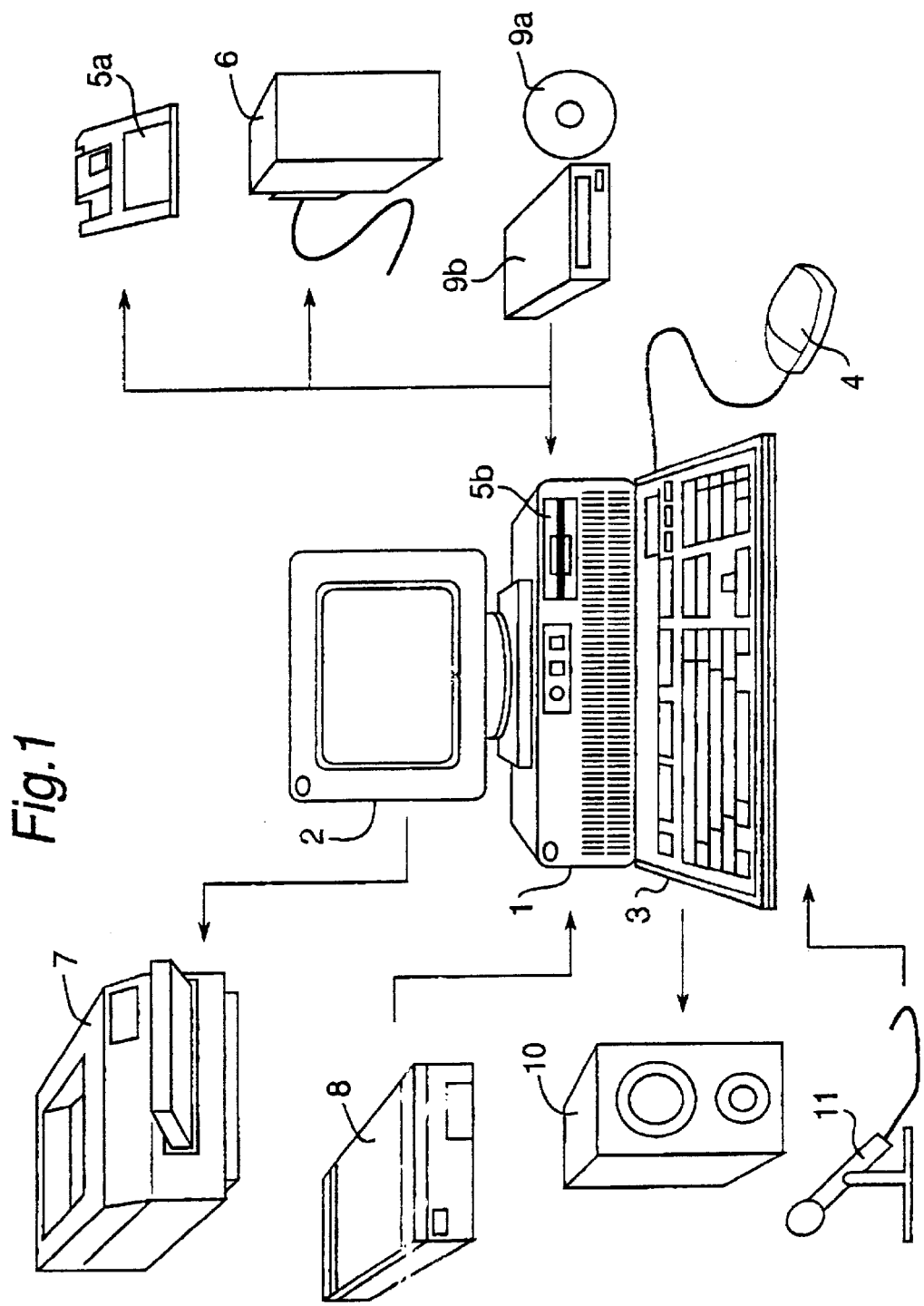
FIG. 1 is a typical overview of an image data processing apparatus according to a first embodiment of the present invention.

FIG. 1 is a typical overview of an image data processing apparatus, an "image processing system" below, according to a preferred embodiment of the present invention. As will be known from FIG. 1, this image processing system is built around a controller 1 for controlling the overall system and comprising a central processing unit (CPU). The CPU is a microprocessor such as an Intel Pentium (TM) processor, but shall not be limited thereto. The controller 1 is typically connected to peripherals such as a display 2 for displaying images and text as well as prompts and other interface elements for operating the system; a keyboard 3 and mouse 4 or other pointing device for entering information and commands, and manipulating interface elements; a floppy disk drive 5b and hard disk 6 for data and application storage; a printer 7 for printing images or text; a scanner 8 for capturing image data; a CD-ROM drive 9b for reading data stored to a CD-ROM 9a; one or more speaker 10 for audio output; and a microphone 11 for audio input.

Figure 2:
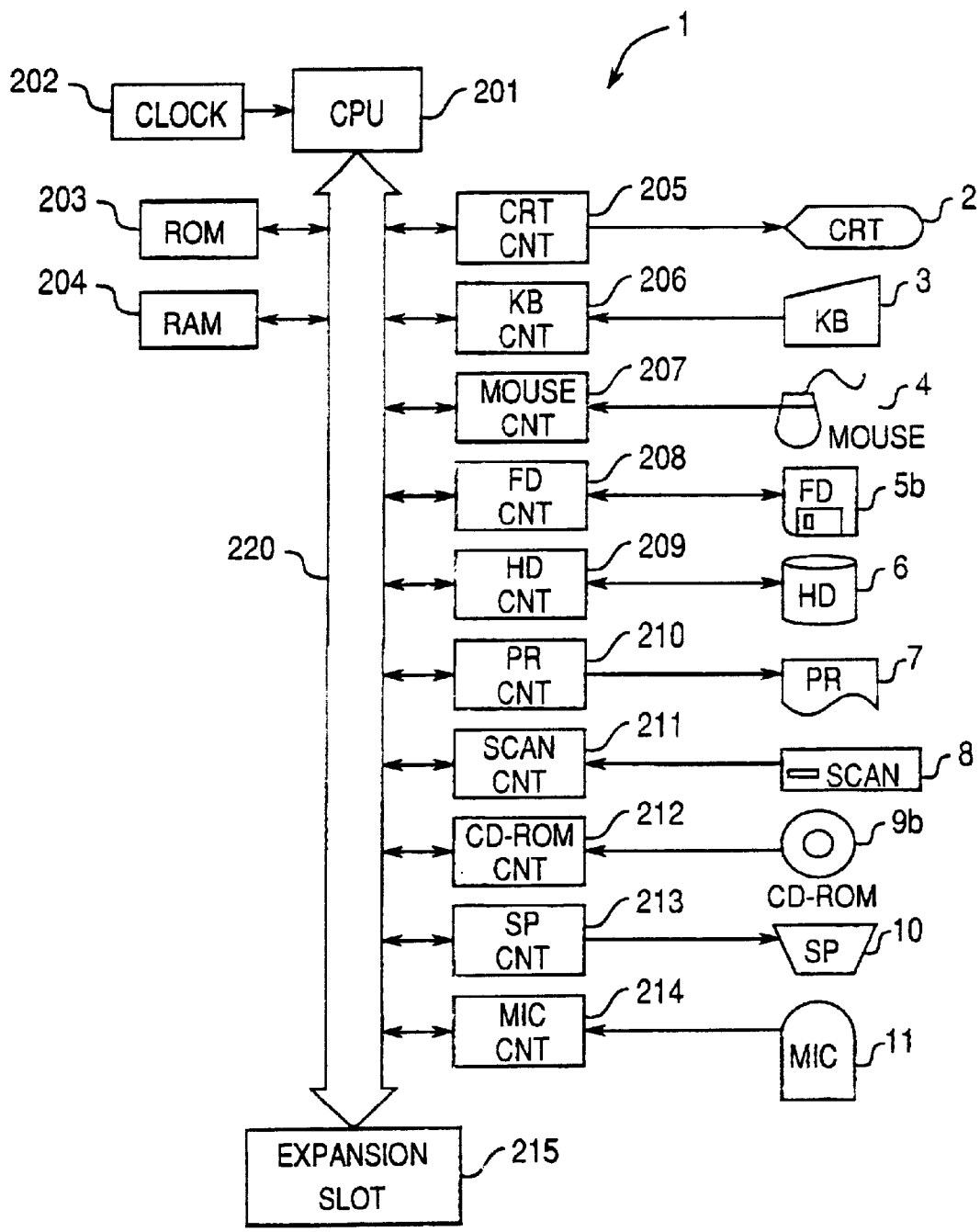
FIG. 2 is a block diagram of a typical controller for the image data processing apparatus shown in FIG. 1.

FIG. 2 is a block diagram of the above-described image processing system. The CPU 201 is connected via a data bus 220 to ROM 203 and RAM 204. The ROM 203 stores the program controlling the image processing system. The RAM 204 temporarily stores data and program code executed by the CPU 201 to control the image processing system. Other circuits connected to the CPU 201 via the data bus 220 include a display controller 205, keyboard controller 206, mouse controller 207, floppy disk drive (FDD) controller 208, hard disk drive (HDD) controller 209, printer controller 210, scanner controller 211, CD-ROM controller 212, speaker controller 213, and microphone controller 214.

The display controller 205 controls the display 2 for text and image display. The keyboard controller 206 controls data input and routing data from the keyboard 3, and the mouse controller 207 controls routing input from the mouse 4. The FDD controller 208 controls the floppy disk drive 5b, and the HDD controller 209 controls the hard disk 6. The printer controller 210 controls output to the printer 7. The scanner controller 211 controls scanner 8 operation. The CD-ROM controller 212 controls the CD-ROM drive 9b. The speaker controller 213 controls audio output from the speaker 10, and the microphone controller 214 controls audio input from the microphone 11.

A clock 202 generating the reference clock required for system operation is also connected to the CPU 201. An expansion slot 215 for connecting expansion boards providing additional functionality to the system is also connected to the CPU 201 via the data bus 220. An exemplary expansion board is a SCSI interface board which when connected to the expansion slot 215 enables connecting a floppy disk drive 5b, hard disk 6, scanner 8, CD-ROM drive 9b, or other peripheral device.

It will be obvious that while the above system is described as using a floppy disk 5a and hard disk 6 for image data storage, a magneto-optical (MO) drive and media or other type of mass storage media can be alternatively or additionally used.

In addition, a scanner 8 is used for capturing image data, but other data input and capturing means can also be used, including still video cameras, digital cameras, or even video boards for capturing images from moving picture data streams.

Yet further, a printer 7 is used as an output device, but a digital copier and other types of hard copy output devices can be used.

The application program used for the data management system is described above as stored to the ROM 203, but the image processing system shall not be so limited. That is, the application program can be stored in whole or in part to a floppy disk 5a, hard disk 6, CD-ROM 9a, or other storage media, and the required program code and data read from the storage medium to RAM 204 for execution.

The image processing system also has an image database containing the actual image data and additional information, such as search keys, for storing and managing the image data. The image database has a logical structure stored on a hard disk 6 or other data storage medium. An exemplary image database structure used by this image processing system is shown in FIG. 3. The fields of this exemplary image database 50 include "image data," "keyword," "feature value 1," and "feature value 2." The image data field holds the image information being managed and manipulated. The keyword field holds one or more keywords used for text-based image searches. The feature value 1 and 2 fields hold information indicative of specific features in the image.

The gray level co-occurrence matrix and inertia properties used for image feature extraction in the present embodiment are described next below.

Methods using a gray level co-occurrence matrix (GLCM) for texture analysis are known from the literature, and are described in detail in, for example, "Basics of image recognition II: feature extraction, edge detection, and texture analysis" (in Japanese, by Shunji Mori et al.; Ohmsha).

This method is based on evaluating a two-dimensional probability density function $f(i,j|d,\theta)$ where the probability density function $f(i,j|d,\theta)$ indicates the likelihood of a pixel separated distance d in direction θ from a pixel having a gray level i having a gray level j. The gray level co-occurrence matrix is a matrix of functions $f(i,j|d,\theta)$ for each (d, θ), i and j indicating row and column positions, respectively. When the texture is coarse and the distance d is small relative to the size of the component elements of the texture, a pixel pair separated (d,θ) generally have similar gray levels, and the values proximal to diagonal elements of the gray level co-occurrence matrix are thus relatively high. Conversely, if the texture is fine and distance d is roughly equivalent to the size of the component elements of the texture, there is a higher probability that any (d,θ) pixel pair will be a pair of dissimilar gray levels, and there will be a relatively uniform distribution across all elements of the co-occurrence matrix.

When building the gray level co-occurrence matrix in the present embodiment, the image is scanned in four directions θ at angles of 0, 45, 90, and 135 degrees passing through a center of the image as shown in FIGS. 4A to 4D and described in further detail below. Matrix $S_\theta(d)$ is defined as shown by equations (1) to (4) below using the gray level co-occurrence matrix $M(d,\theta)$.

$$S_0(d) = \{M(d,0°) + M^t(d,0°)\}/2 \quad (1)$$

$$S_{45}(d) = \{M(d,45°) + M^t(d,45°)\}/2 \quad (2)$$

$$S_{90}(d) = \{M(d,90°) + M^t(d,90°)\}/2 \quad (3)$$

$$S_{135}(d) = \{M(d,135°) + M^t(d,135°)\}/2 \quad (4)$$

where $M^t(d,\theta)$ is a transposed matrix of $M(d,\theta)$.

These matrices can be used to calculate various feature quantities, construct a feature space, and discriminate textures.

The inertia of the gray level co-occurrence matrix, which is one of the above-noted feature quantities, can be obtained using the equation $$I\{S_\theta(d)\} = \sum_{i=0}^{N_G-1} \sum_{j=0}^{N_G-1} (i-j)^2 S_\theta(i,j|d) \qquad (5)$$

where $S_\theta(i,j|d)$ is the i row, j column element of matrix $S_\theta(d)$, and $N_G$ is the number of gray levels in the image.

Because gray level occurrence is directly related to the periodicity of the texture pattern, the periodicity of a texture should be reflected in $S_\theta(i,j|d)$. Whether such periodicity exists is determined from a graph of inertia values obtained at distance d, where d ranges from 3, 4, ... $d_{max}$ where $d_{max}$ is the greatest distance d), for each direction θ. This method of evaluation is described below.

The first step is to obtain inertia $I\{S_\theta(d)\}$ at each distance d for each direction θ, and then obtain the lowest inertia value $I_{ner}(\theta)$ from the set of inertia values $I\{S_{74}(d)\}$ in each direction θ. $I_{ner}(\theta)$ is obtained by the following equation $$I_{ner}(\theta) = \text{Min}(I\{S_\theta(3)\}, I\{S_\theta(4)\}, \ldots, I\{S_\theta(d_{max})\}) \qquad (6)$$

The smallest and second-smallest values are then selected from $I_{ner}(0)$, $I_{ner}(45)$, $I_{ner}(90)$ and $I_{ner}(135)$. If the lowest of the selected inertia values $I_{ner}(\theta)$ is less than a predetermined threshold value, the texture is determined to have a periodic characteristic.

Figure 5:
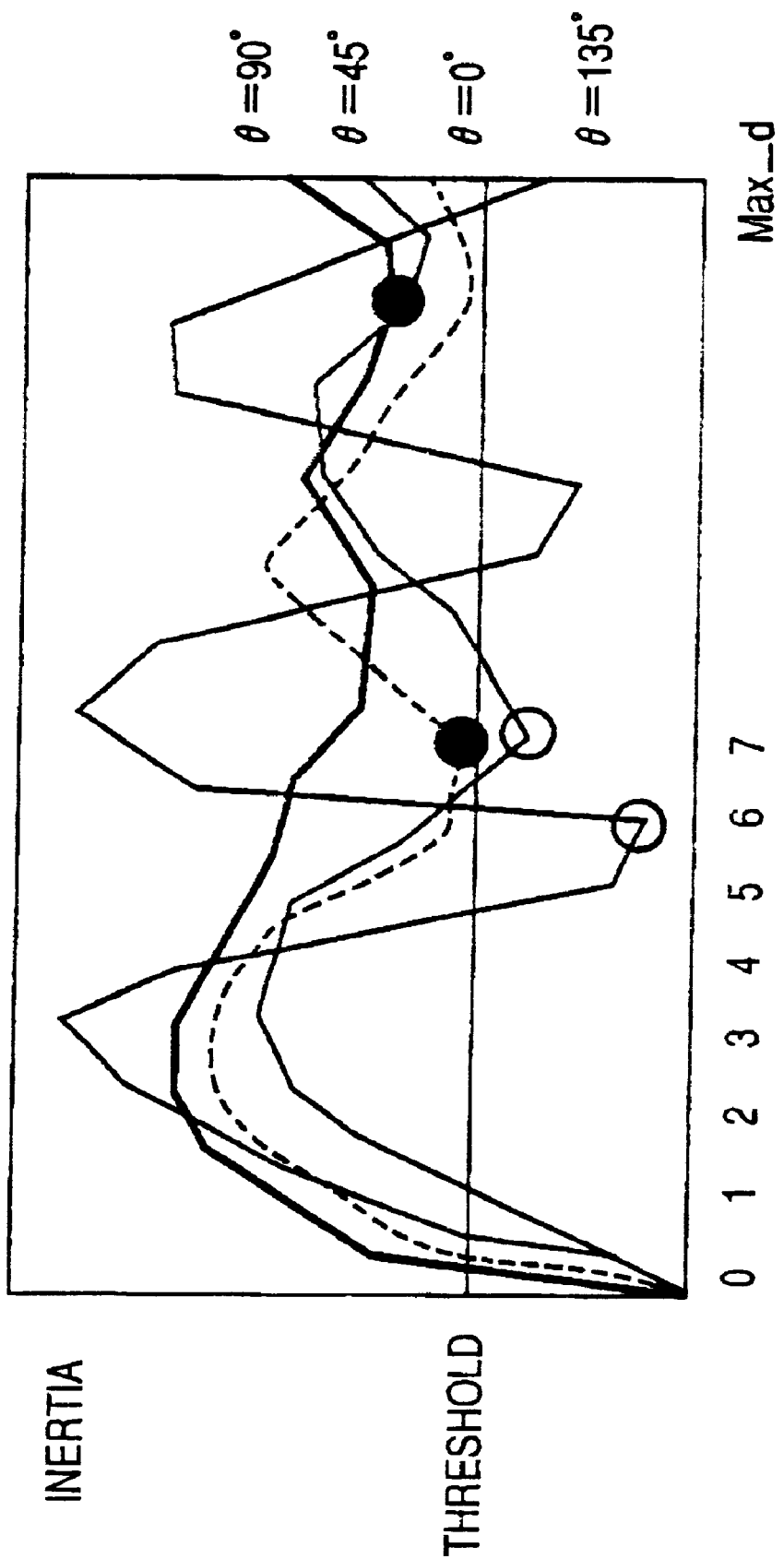
FIG. 5 is an illustration to show inertia values I obtained at distances d in each scanning direction θ.

This is illustrated further in FIG. 5, a graph of inertia I at multiple distances d for a particular pixel in each of four directions θ. In the example shown, the minimum inertia $I_{ner}$ value was obtained at a distance d=7 for direction θ=0°, at distance d=7 for direction θ=45°, at distance d=13 for direction θ=90° and at distance d=6 for direction θ=135°. $I_{ner}(135)$ thus has the lowest inertia I of any direction, and $I_{ner}(45)$ has the second lowest inertia. Both $I_{ner}(135)$ and $I_{ner}(45)$ are also below the threshold value to determine periodicity, and it is therefore determined that the image texture has a periodic characteristic at both direction θ=45° and 135°.

Figure 6:
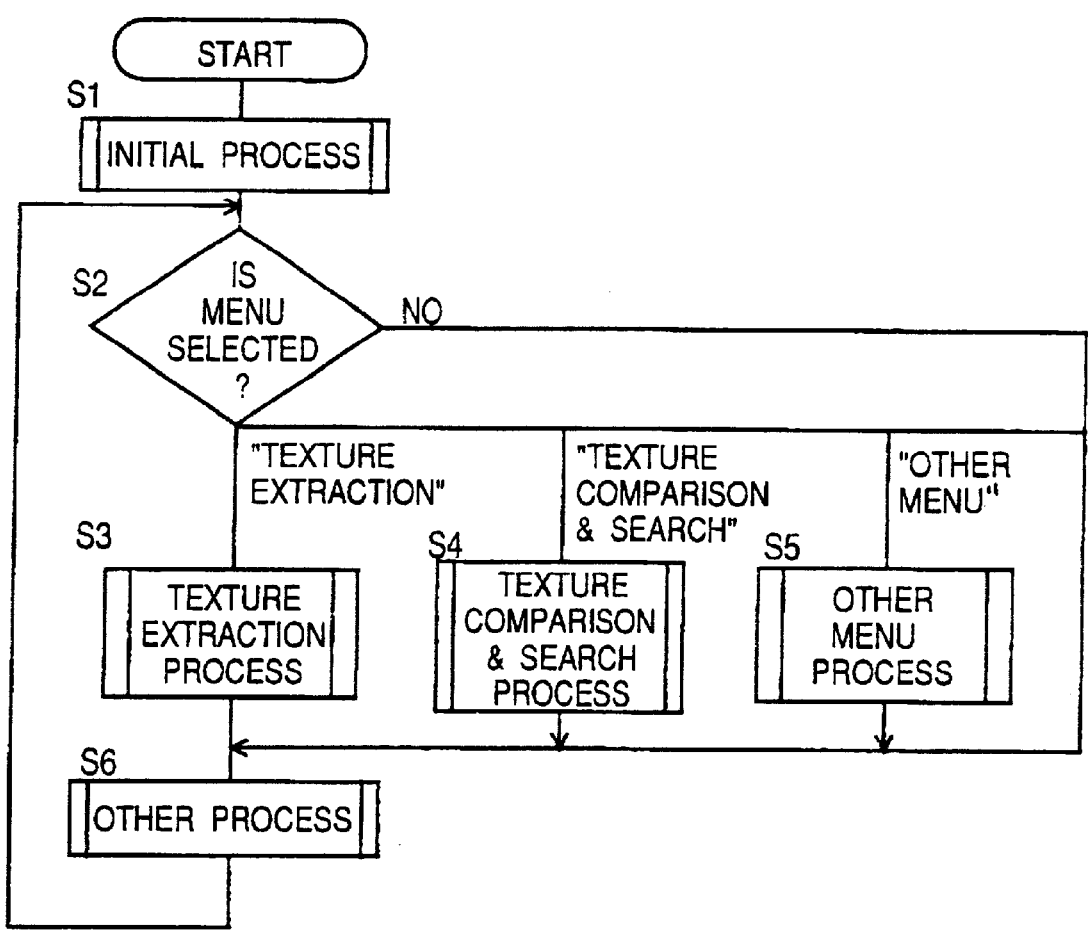
FIG. 6 is a flow chart of the main control routine of an image data processing apparatus according to the first embodiment of the invention.

Control and operation of the present image processing system is described in further detail below with reference to FIG. 6, a flow chart of the main control routine of the program implemented by the present system. The CPU 21 executes this procedure defined by this flow.

Figure 7:
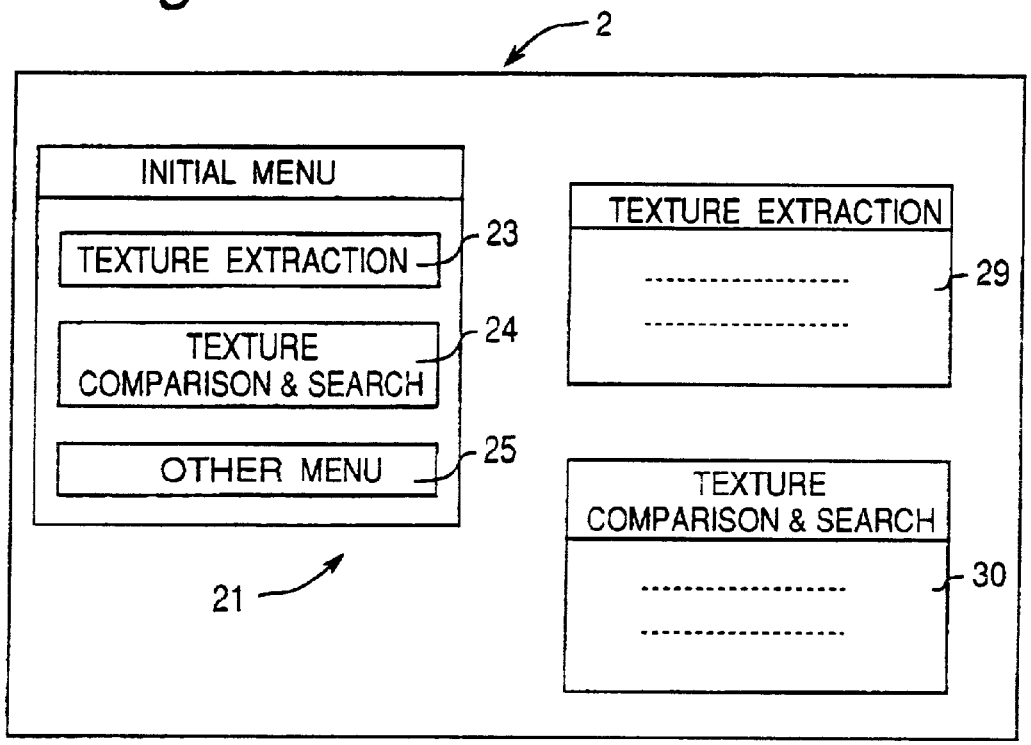
FIG. 7 is a typical illustration of data entry or setting screens.

The first step performed when this program is invoked is to initialize the various flags, screen menus, and other required elements (S1). An exemplary initial display screen is shown in FIG. 7. Selection items 23 to 25, which are used for selecting a specific process, are displayed, for example, as icons in the initial menu screen 21. When the user selects one of these items 23 to 25, the corresponding task (process) is executed. Menu (task) selections and data entry are accomplished by the user with the keyboard 3 and/or mouse 4 in both the initial menu screen 21 and other screens displayed on the display 2.

After initialization, it is determined whether the user made a selection from the initial menu screen 21 (S2). If "texture extraction" item 23 is selected, the texture extraction process (S3) is performed to extract texture features from the specified image data and store the extracted texture feature to the image database 50.

If "texture comparison and search" item 24 is selected, the texture comparison and search process (S4) is performed to compare the texture of the specified image data with the texture of the image stored to the image database 50 and search similar image data.

If "other menus" item 25 is selected, the process (S5) corresponding to that menu selection is performed.

The control loop advances to perform the next operation (S6) after the texture extraction process (S3), texture comparison and search process (S4), or other menu process (S5) is completed, or if no menu is selected by the user ("NO" in step S2). Once this other process (S6) is completed, the control goes back to the step S2, and the above process repeats.

The operation performed by the other menu process (S5) is basically the same as in other common search systems, and is not directly related to the present invention. Further description thereof is thus omitted below, where the texture extraction process (S3) and the texture comparison and search process (S4) are described in detail.

Figure 8:
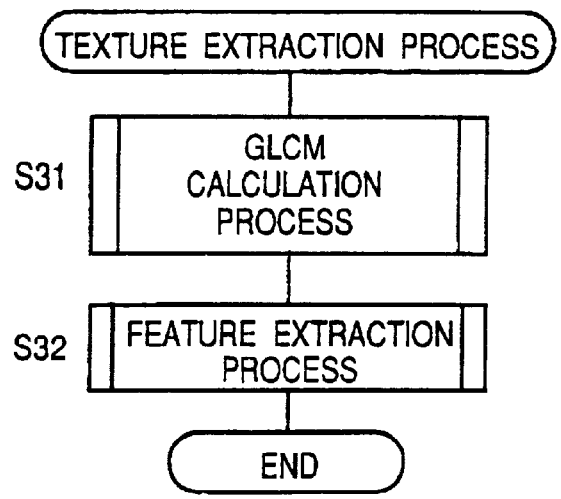
FIG. 8 is a flow chart of the texture extraction process of an image data processing apparatus according to the first embodiment of the invention.

The texture extraction process (S3) is described first with reference to a flow chart thereof as shown in FIG. 8. In this texture extraction process (S3), two processes are performed. One is a gray level co-occurrence matrix (GLCM) calculation process (S31) for calculating the gray level co-occurrence matrix from the image data when image data is stored to the image database 50. The other is a feature extraction process (S32) for extracting texture features based on the result of the GLCM calculation process (S31), and storing the extracted feature information with the image data to the image database 50. These processes are described in detail below with reference to the flow charts thereof in FIGS. 9 and 10.

Figure 9:
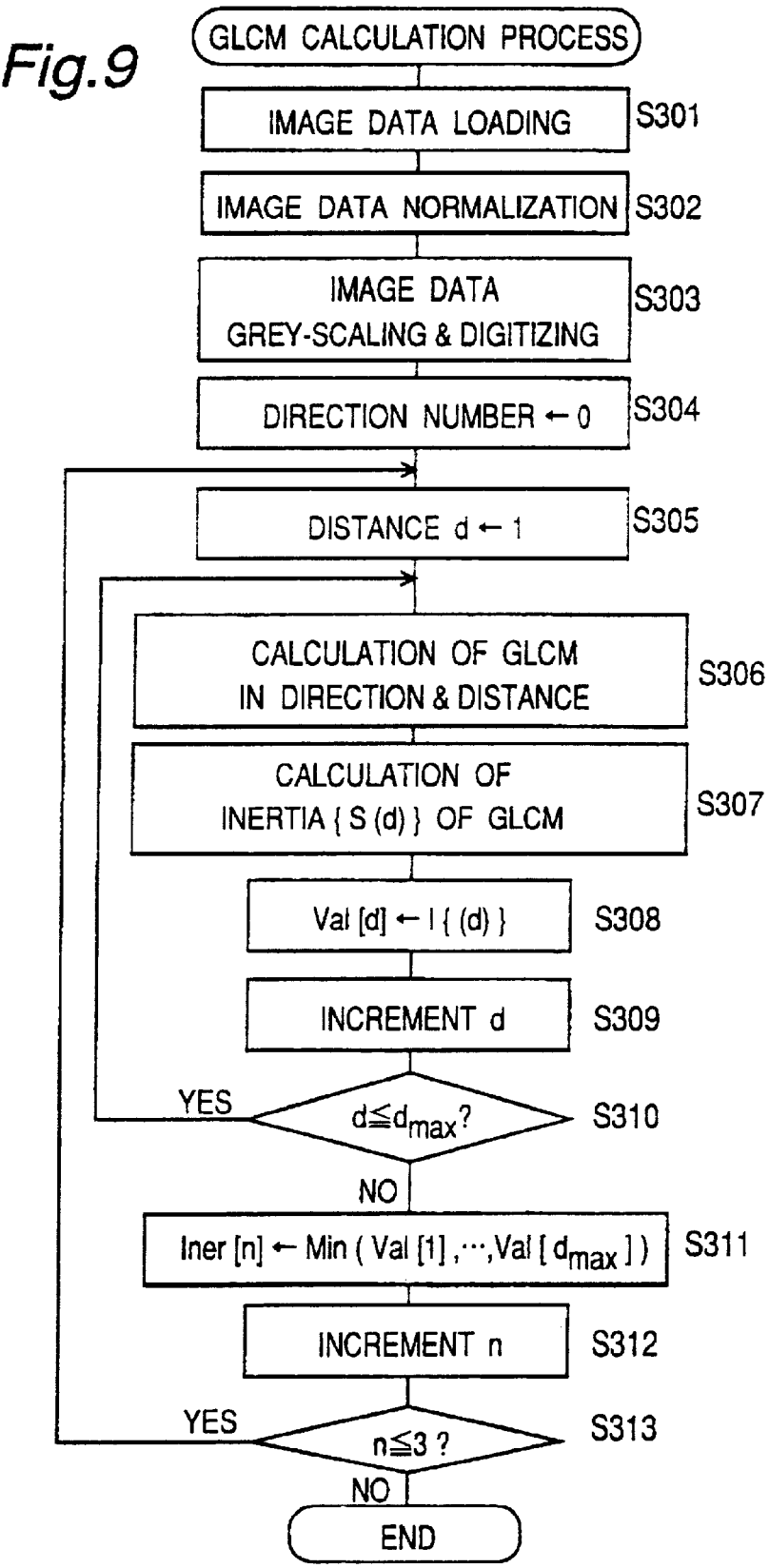
FIG. 9 is a flow chart of the gray level co-occurrence matrix (GLCM) calculation process of an image data processing apparatus according to the first embodiment of the invention.

FIG. 9 is a flow chart of the GLCM calculation process (S31). This process starts by loading (S301) the image data from a storage medium like the database or file system etc., and then normalizing (S302) the image data. This normalization process reduces or enlarges the image to a standard image size as a means of reducing the processing time and reducing noise during image processing. In the present embodiment, images are reduced to fit a 120×120 pixel area while retaining the original aspect ratio.

The normalized image data is then converted to a gray-scale image and digitized (S303). To address the problem of the digitizing process described in the above review of related technologies, the threshold value is not set to a pixel value with a high frequency of appearance, but is rather set to a value offset a predetermined amount above or below a median pixel value of a pixel value distribution after grayscale conversion. This is described specifically below.

Figure 10:
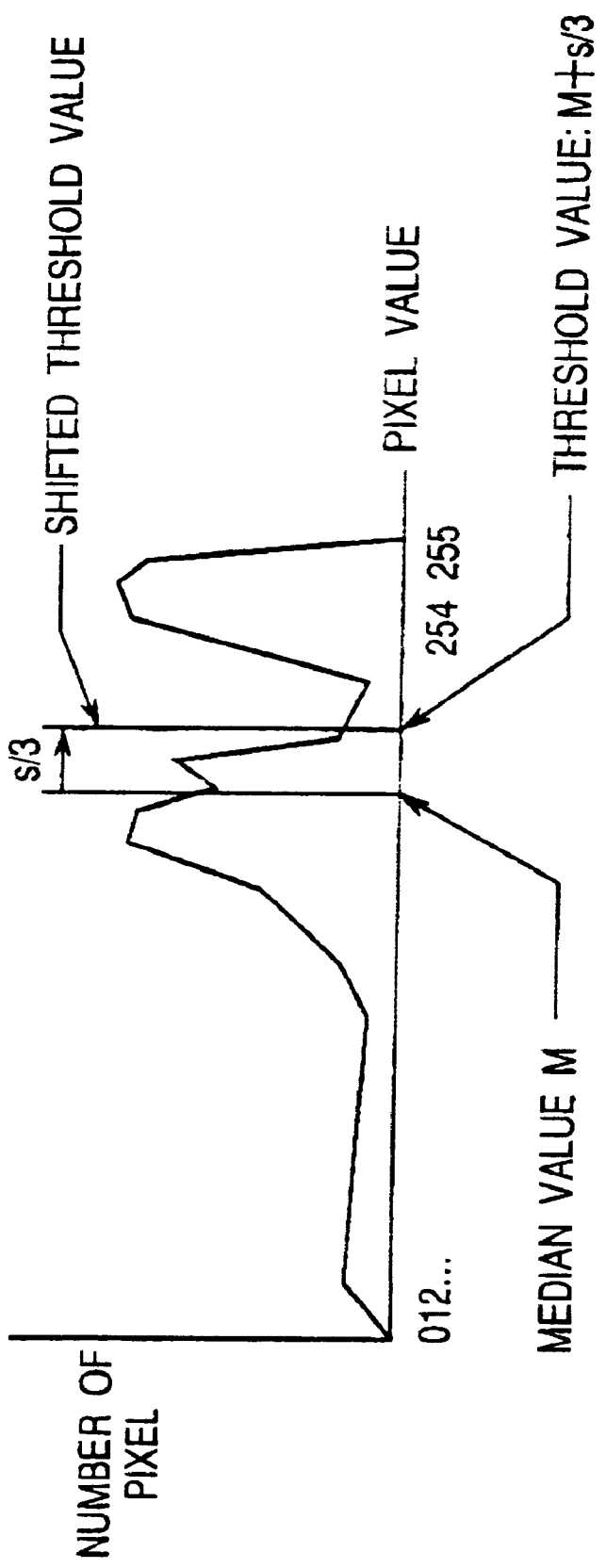
FIG. 10 is a graph to describe a method of determining the threshold value for a digitizing process.

FIG. 10 is a graph of the pixel value distribution in relation to the pixel values after gray scale conversion for a certain image. There are 256 gradations possible in the present example. As shown in FIG. 10, the threshold value is set to a value that is greater than the median pixel value (M) of the pixel value distribution by a third of the standard deviation (s), i.e. M+s/3. By thus offsetting the threshold value used for digitizing the image a specific amount from the median pixel value of the distribution, the threshold value is not set to a high frequency pixel value, and the image can be digitized while better retaining the features of the original image. It should be noted, however, that the threshold value is set differently in the following cases.

Specifically, if the median M is greater than or equal to 128 (a half value of max graduation), and the cumulative number of pixels at the median M is 90% or greater than 90% of the total number of pixels, then pixels with a pixel value less than the median M are set to zero (0), and pixels with a pixel value greater than or equal to the median M are set to 1.

Further, if the median M is less than 128, and the cumulative number of pixels at the median M is 90% or greater than 90% of the total number of pixels, then pixels with a pixel value less than or equal to the median M are set to zero (0), and pixels with a pixel value exceeding the median M are set to 1.

In addition, if the cumulative number of pixels at the value (M+s/3: median M plus a third of deviation s) is 100% of the total number of pixels, then the threshold value is set to the median M.

By thus conditionally defining the threshold value used for the digitizing process, the resulting digital image will be closer to the original image.

When image normalization (S302) and digitizing (S303) are completed, the gray level co-occurrence matrix (GLCM) is calculated from the resulting image data. This starts by initializing the direction counter n to 0 (S304). Note that the direction counter corresponds to the scanning directions θ used for gray level co-occurrence matrix calculation such that scanning direction θ=0° when n=0, θ=45° when n=1, θ=90° when n=2, and θ=135° when n=3.

It should be noted that texture orientation can be determined with greater directional precision by using a smaller angle increment between scanning directions. For example, if the angle increment used for gray level co-occurrence matrix calculation is 10 degrees, the scanning direction θ=0° when n=0, θ=10° when n=1, θ=20° when n=2, and so forth. This, however, increases the number of calculation processes that must be executed, and thus increases the processing time required. An increment of 45° is therefore used in the present embodiment.

Then, the pixel distance d to be used for calculating the gray level co-occurrence matrix is initialized to 1 (S305). The gray level co-occurrence matrix is then calculated to distance d in direction n (S306). During this first pass through the calculation loop, therefore, the matrix is calculated to the first distance in the first direction.

It should be noted that the image processing system according to the present embodiment does not calculate the gray level co-occurrence matrix for every pixel in the entire image, but confines matrix calculation to pixels in a band of a predetermined width in the currently selected scanning direction. The predetermined band width is small enough relative to the image size to achieve high speed processing, but large enough to obtain a meaningful gray level co-occurrence matrix. It will be obvious that increasing the band width will improve the precision of the calculated matrix, while also slowing the process because of the larger number of pixels that must be calculated. On the other hand, narrowing the band width will accelerate the process but decrease the precision of the calculated matrix.

Figure 4A:
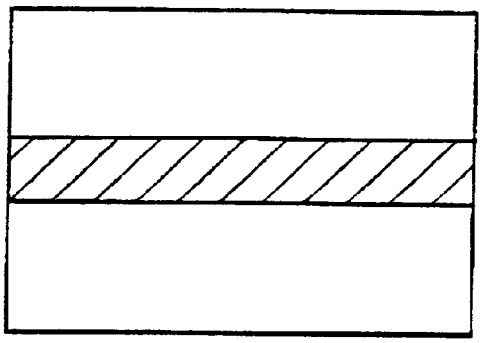
FIGS. 4A to 4D are illustration to show scanning direction θ used for calculating a gray level co-occurrence matrix in a preferred embodiment of the invention.
Figure 4B:
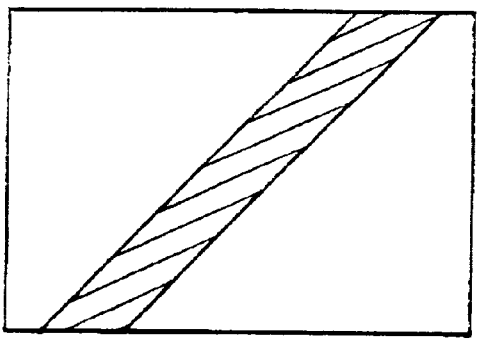
Figure 4C:
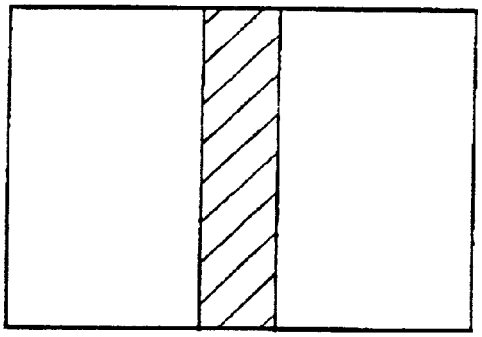
Figure 4D:
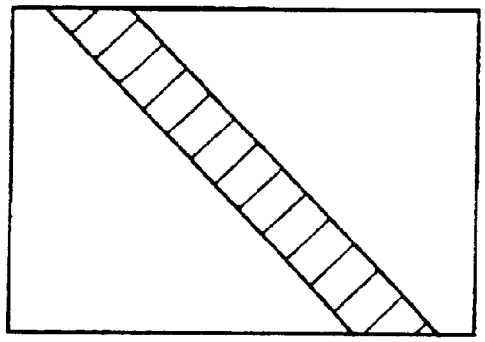

As noted above, the normalized image size is 120×120 pixels in the present embodiment. The width of an exemplary scanning band is therefore set to 10 pixels. Referring to FIGS. 4A to 4D, this means that the scanning band in direction 0 (θ=0°) is a horizontal band 10 pixels wide passing from side to side through the center of the image. Likewise, the band in direction 1 (θ=45°) is a 10-pixel wide band passing from the bottom left to the top right through the center of the image as shown in FIG. 4B; the band in direction 2 (θ=90°) is a 10-pixel wide band passing from the bottom to the top through the center of the image as shown in FIG. 4C; and the band in direction 3 (θ=135°) is a 10-pixel wide band passing from the bottom right to the top left through the center of the image as shown in FIG. 4D.

It should be noted, however, that the scanning band does not need to be a continuous band as shown in FIGS. 4A to 4D, and can be a band comprising a plurality of discontinuous lines, line segments, or bands insofar as they share a common directionality. For example, the scanning band could comprising ten lines of discretely positioned single pixels. If there is textural periodicity in the overall image, the periodicity will also be captured by scanning such discontinuous bands.

Next inertia $I\{S_\theta(d)\}$ is calculated from the gray level co-occurrence matrix obtained in step S306 using equation (5) (S307). The calculated inertia $I\{S_\theta(d)\}$ value is then inserted to array Val[d] (S308). The distance d value is then incremented (S309).

Next it is determined whether distance d exceeds a predefined maximum distance $d_{max}$ (S310). If it does, step S311 is performed. If it does not, that is, if distance d is less than or equal to maximum distance $d_{max}$, the procedure goes back to step S306, and the loop from steps S306 to S310 repeats until distance d exceeds maximum distance $d_{max}$. Note that maximum distance $d_{max}$ is set to a value approximately equal to half the image size in the present embodiment.

After the array Val[d] has been filled with the values for all distances d in the same direction, the minimum value of Val[d] is determined and the minimum value is set to inertia $I_{ner}[n]$ in that direction (S311).

The direction counter n is then incremented (S312) to specify the next scanning direction. If the incremented counter n does not exceed 3 (S313), the control loops back to step S305, and the steps from S305 to S313 are repeated. The process ends once inertia values have been calculated for all directions n (n is greater than 3 in S313).

By thus determining the inertia of an image in a particular direction using a gray level co-occurrence matrix, image features can then be extracted based on the calculated values of inertia. In the present embodiment, the periodicity of an image texture is extracted as a texture feature. It is known that when the values of inertia obtained from a gray level co-occurrence matrix are observed in the same direction, the inertia values at a particular distance d appear increasingly periodic as the periodicity of the texture becomes more pronounced. The value of inertia also approaches 0 at the distance d where image periodicity occurs. The image processing system according to the present embodiment therefore determines a threshold value for evaluating spatial periodicity, and compares this threshold value with the lowest value of inertia. If the lowest value of inertia is less than the threshold value, it is known that spatial periodicity occurs in the image at the distance d yielding the lowest value of inertia.

Figure 11:
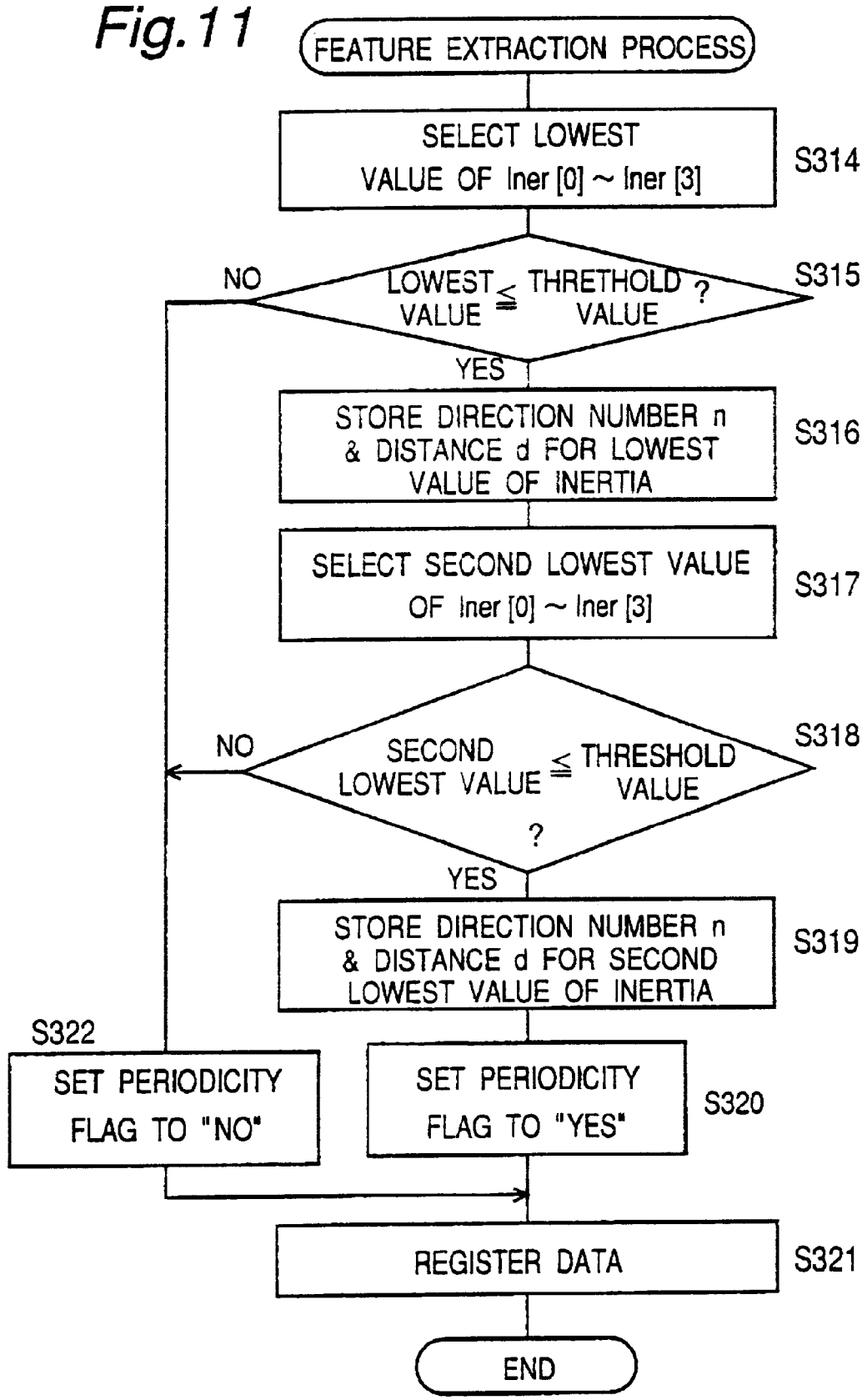
FIG. 11 is a flow chart of the feature extraction process of an image data processing apparatus according to the first embodiment of the invention.

FIG. 11 is a flow chart of the feature extraction process (S32) shown in FIG. 8. This process starts by selecting the lowest value of inertia from the inertia value arrays $I_{ner}[0]$ to $I_{ner}[3]$ in which the lowest value of inertia is stored for each scanning direction (S314). Then the selected lowest value of inertia is compared with the threshold value used for determining spatial periodicity (S315). If the selected lowest value of inertia exceeds the threshold value ("No" in the step S315), a step S322 is performed. If not ("YES" in the step S315), a step S316 is performed.

In the step S316, the direction counter n and period d corresponding to that lowest value of inertia are stored as texture feature. Note that the period yielding the lowest inertia is called the "first period" below. The direction and period of the corresponding texture feature are called the "first period features."

The second lowest value of inertia is then selected from the arrays $I_{ner}[0]$ to $I_{ner}[3]$ in which the lowest value of inertia is stored for each of the four scanning directions (S317). Then, this second lowest value of inertia is compared with the threshold value used for determining spatial periodicity (S318). If this second lowest value exceeds the threshold value ("No" in the step S318), a step S322 is performed. If not ("YES" in the step S318), a step S319 is performed.

In the step S319, the direction counter n and period d corresponding to that value of inertia are stored as texture feature. Note that the period yielding the second lowest inertia is called the "second period" below, and the direction and period of the corresponding texture feature are called the "second period features."

Once the second period features are stored, the periodicity flag is set to "YES" (S320), the data is stored to the image database 50 (S321), and the procedure ends. Note that for the periodicity flag, "YES" indicates that spatial periodicity is present in the image, and "NO" indicates that there is no spatial periodicity in the image. In the step S322, the periodicity flag is set to "NO".

Finally, the image data and periodicity flag are stored together to the image database 50 (S321), when spatial periodicity is detected, the detected features are also stored to the image database 50.

As will be known from the preceding description, the image processing system of the invention obtains information indicative of whether spatial periodicity is present in the scanned image, and stores this information in the form of the above-noted periodicity flag. When periodicity is detected, the direction and period of a first period, and the direction and period of a second period, are obtained and stored as texture features.

Furthermore, while the first and second direction features alone are meaningful as texture features, the direction and period information can be used to extract a partial image that can be used as a pattern for generating image textures.

The texture comparison and search process (S4 in FIG. 6) is described next with reference to a flow chart thereof in FIG. 12. When this process is invoked, a user selects an image from an on-screen selection using a keyboard 3 or other input device for use as the search key (the "key image" below). The system then seeks images in the image database 50 having a texture feature with a strong resemblance to the texture features of the key image, and displays the results on the display 2.

Figure 12:
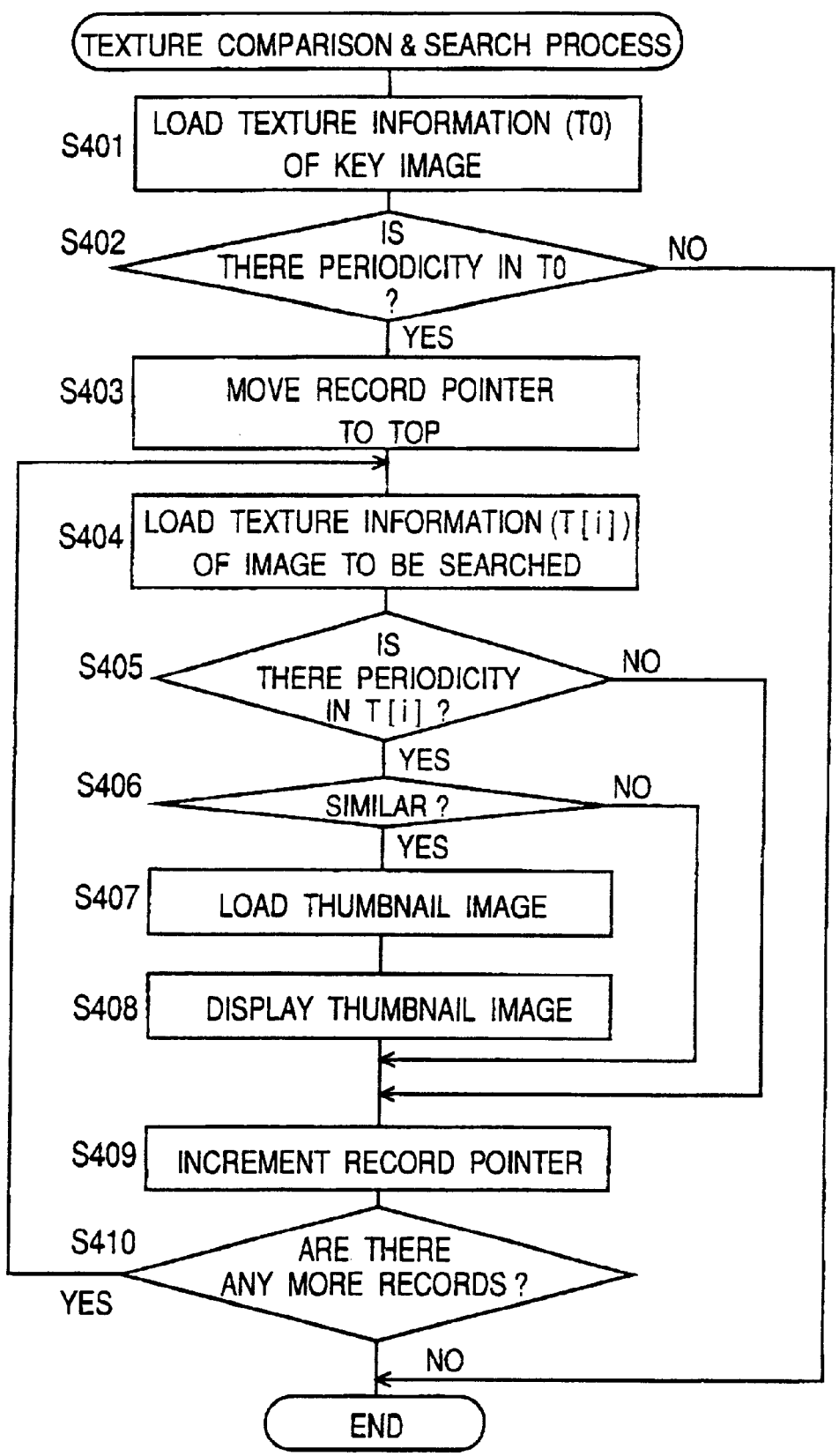
FIG. 12 is a flow chart of the texture comparison and search process of an image data processing apparatus according to the first embodiment of the invention.

FIG. 12 is a flow chart of the texture comparison and search process. Referring now to FIG. 12, the texture information (T0) of the key image selected by user is loaded from the image database 50 (S401). This texture information is stored to the image database 50 at the time the image is stored thereto, and includes the periodicity flag, first direction features, and second direction features. It is determined whether there is any spatial periodicity in the texture information of the selected key image by reading the periodicity flag set by the texture feature extraction process (S402). If there is no periodicity, the process ends. If there is, the record pointer i is moved to the top of the image database 50 being searched (S403).

The texture information T[i] of the image indicated by the record pointer i is then loaded from the image database 50 (S404).

Then it is determined whether there is spatial periodicity in the selected image based on the periodicity flag in the texture information T[i] (S405). If there is spatial periodicity in the selected record, a step S406 is performed. If not, a step S409 is performed.

In the step S406, it is determined whether the image pointed by the record pointer and the key image are similar. This determination is done based on a similarity between the texture information T0 of the key image and the texture information T[i] of the selected image record. The similarity is calculated using a method as described below. If the images are not similar, the record pointer i is incremented (S409).

If the images are similar, a thumbnail image is loaded (S407) and then displayed (S408) for the user on the display 2.

It should be further noted that the result of the search and comparison operation can be displayed in various ways, including but not limited to the following: simply displaying a thumbnail as described above, displaying the image title or name, displaying the file name and path to the original image from which a thumbnail image is generated, and displaying the source from which the original image was obtained. It is also possible to count the number of similar images found, and display the counted number.

Then the record pointer i is incremented (S409). After that, it is determined whether there are any more records in the image database 50 to be compared with the key image (S410). If there are, the procedure loops back to step S404, and steps S404 to S410 are repeated until the record pointer reaches the end of the image database 50. When all records in the database 50 have been accessed and compared, the procedure ends.

An exemplary method of calculating image similarity in S406 is described below using the direction and period of the first period feature and the direction and period of the second period feature. That is, similarity D between texture T0 of period $(d_0(1), d_0(2), \theta_0)$ and texture Ti of period $(d_i(1), d_i(2), \theta_i)$ can be obtained from the following equation $$D = 1 - \frac{W_A\left(\frac{\text{Min}(R_0, R_i)}{\text{Max}(R_0, R_i)}\right)^2 + W_\theta\left(\frac{\theta_0 - \theta_i}{90.0}\right)^2}{W_A + W_\theta} \quad (7)$$

where similarity increases as the calculated value of D increases, and $d_0(1)$ is the period of the first period of texture information T0 for the key image, $d_1(1)$ is the period of the first period of texture information Ti for the image being compared from the database, $d_0(2)$ is the period of the second period of texture information T0 for the key image, $d_1(2)$ is the period of the second period of texture information Ti for the image being compared from the database, $\theta_0$ is the angle of the direction of the first period, $\theta_i$ is the angle of the direction of the second period, $W_A$ and $W_\theta$ are weights used for determining similarity, and $R_0$ and $R_i$ are the aspect ratio of the pattern shape, and are defined by equations (8) and (9) below.

$$R_0 = d_0(2)/d_0(1) \quad (8)$$

$$R_i = d_i(2)/d_i(1) \quad (9)$$

As described hereinabove, an image data processing apparatus according to a first embodiment of the present invention calculates a gray level co-occurrence matrix for an image band of a particular width from the original image data, and determines whether there is spatial periodicity (a feature of image texture) in the image data based on the obtained co-occurrence matrix. As a result, the speed of the process extracting texture features from image data is improved.

It should be noted that the present invention shall not be limited to extracting texture features based on image data from a band-shaped region of a particular width. For example, image data along a single line can be used, or image data on a plurality of lines separated with a specific distance can be used.

It must be further noted, however, that while processing is extremely fast when only a single line of image data is used, this method can only be effectively used with certain types of images. This method is suitable, for example, to systems managing image data possibly having a spatial periodicity, such as a textile database of textiles having geometric patterns.

Detecting image features using a plurality of image data lines separated a specific distance also reduces the amount of data to process while enabling texture feature detection across a relatively larger area of the image.

An image data processing apparatus according to the present invention thus efficiently extracts image features by confining the feature extraction operation to image data within an image band of a defined width.

Furthermore, in the image data digitizing process preceding the feature extraction operation, by setting the threshold value to a value offset a specific amount from the median pixel value of the pixel value distribution, images with minimal change in gradation occupying a large area of the image can be digitized without losing the essential original image features. As a result, image features can be more accurately extracted.

(Embodiment 2)

An image processing system according to a second embodiment of the invention extracts a basic texture pattern appearing periodically in an image using a method that is independent of the pattern size and pattern irregularities, and stores the extracted pattern as a feature of the image. Fast, accurate image comparison and search is also made possible by comparing images on the basis of the extracted basic texture pattern.

The hardware configuration of the present embodiment is the same as that of the first embodiment described above, and further description thereof is thus omitted below.

As in the above-noted first embodiment, an image processing system according to the second embodiment also has an image database containing the actual image data and additional information, such as search keys, for storing and managing the image data. The image database is a logical structure stored on a hard disk 6 or other data storage medium. An exemplary image database structure used by this image processing system is shown in FIG. 13.

The fields of an exemplary image database 50 used in this second embodiment include "image data", "keyword", "feature value 1" and "feature value 2". The image data field holds the image information being managed and manipulated. The keyword field holds one or more keywords used for text-based image searches. The feature value 1 and 2 fields hold feature values indicative of specific features in the image. Note that the feature value 1 field in the present embodiment stores the pattern information and periodicity information (direction θ and distance d) needed to identify a particular basic pattern in the image.

Figure 14:
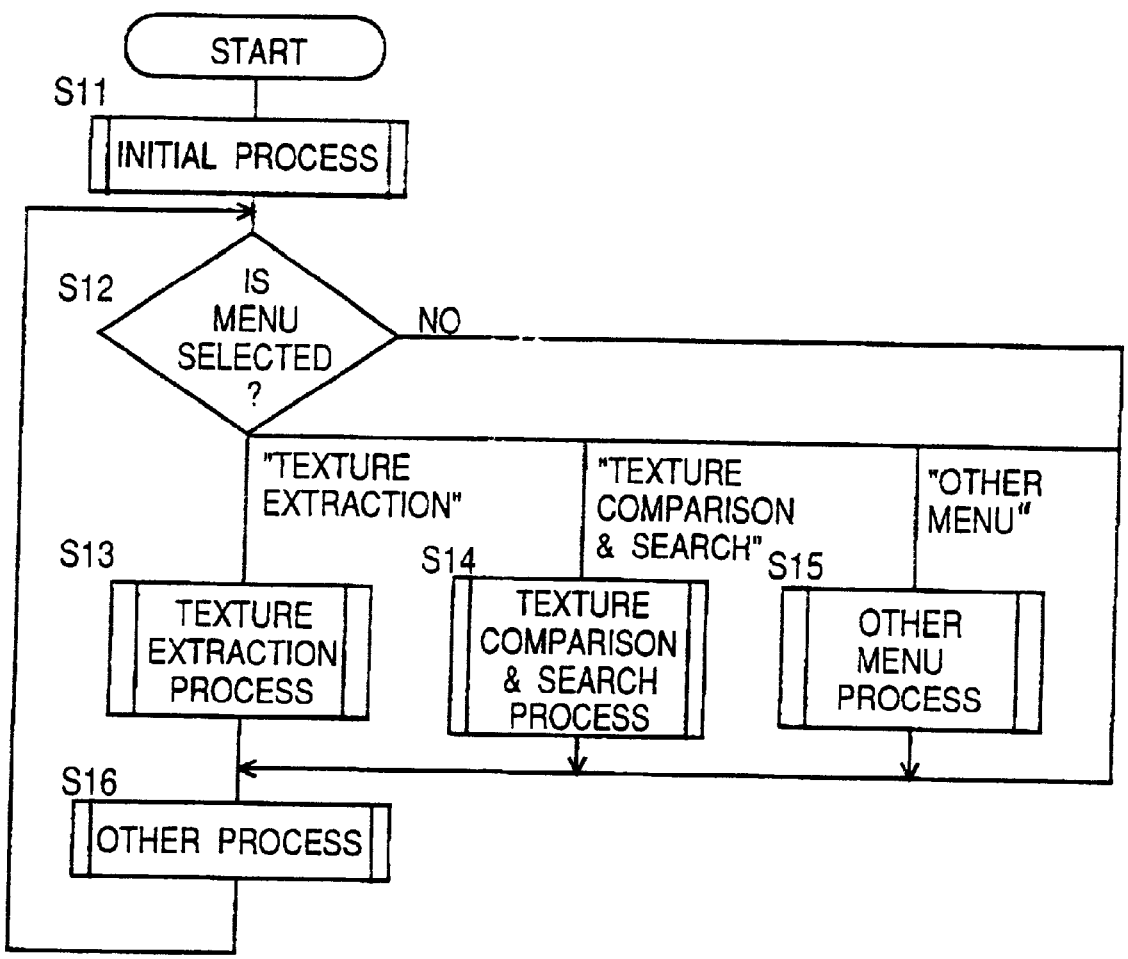
FIG. 14 is a flow chart of the main control routine of an image data processing apparatus according to the second embodiment of the invention.

The operation of an image data processing apparatus according to the present embodiment is described next below with reference to the accompanying flow charts thereof. The main routine of the control program invoked by the present image processing system is shown in FIG. 14.

The first step performed when this program is invoked is to initialize the various flags, screen menus, and other required elements (S11). The menus and screen elements shown on the display 2 are substantially the same as those described above and shown in FIG. 7. Further description thereof is thus omitted below.

After initialization (S11), it is determined whether the user made a selection from the initial menu screen 21 (S12). If the "texture extraction" item 23 is selected, the texture extraction process (S13) is performed to extract texture features from the specified image data and store the extracted feature information to the image database 50.

If the "texture comparison and search" item 24 is selected, the texture comparison and search process (S14) is performed to compare the specified image data with image textures stored to the image database 50 and select similar image data.

If "other menu" item 25 is selected, the other menu process (S15) is performed.

The control loop advances to perform the next operation (S16) once the texture extraction process (S13), texture comparison and searching process (S14), or other process (S15) is completed, or if no menu is selected by the user ("NO" in the step S12). Once this other process is completed (S16), the control loops back to the step S12, and the process repeats.

The texture extraction process (S13) and texture comparison and searching process (S14) are described next in detail below.

Figure 15:
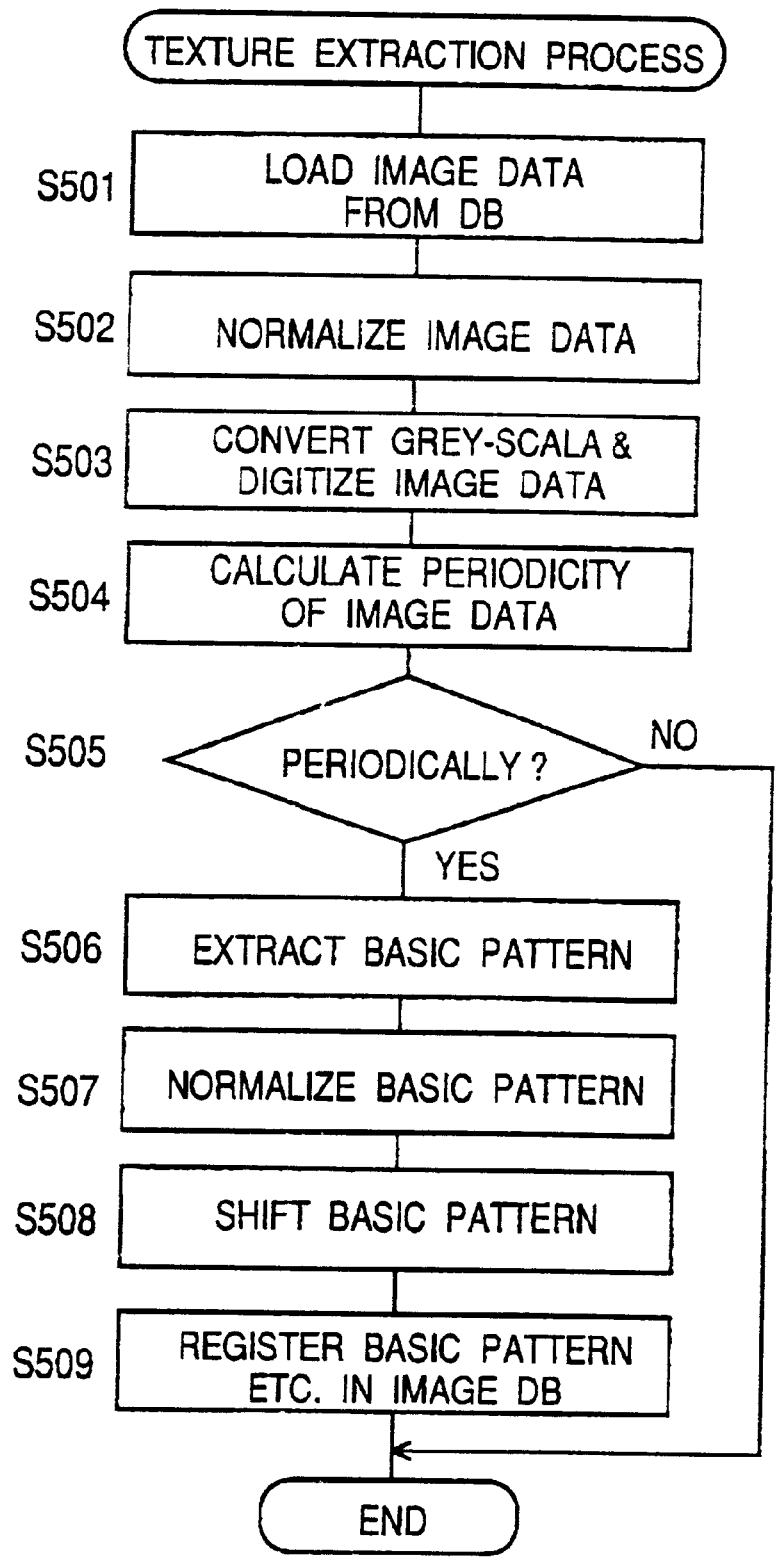
FIG. 15 is a flow chart of the texture extraction process of an image data processing apparatus according to the first embodiment of the invention.

The texture extraction process (S13) is described first with reference to a flow chart thereof shown in FIG. 15. Note that steps S501 to S503 in FIG. 15 correspond to steps S301 to S303 in the flow chart in FIG. 9, and step S504 corresponds to steps S304 to S321 in FIGS. 9 and 10.

When the texture extraction process is invoked, the image data selected by the user is loaded from the image database 50 (S501), and normalized (S502). Normalization here refers to adjusting the image to a standard image size and shape as a means of reducing the image processing time and reducing noise. In the present embodiment, images are reduced to fit a 120×120 pixel area while retaining the original aspect ratio.

The normalized image data is then converted to a grayscale image and digitized (S503). Using the normalized, gray-scale, digital image data, the image is then analyzed to determine the periodicity of image textures (S504).

Periodicity is here defined as the repetition of a same pattern at a certain spatial interval (period or distance d) in a particular direction θ with a frequency exceeding a certain threshold value. This periodicity characteristic can thus be represented by distance d and direction θ. Note that an image texture is determined to have no periodicity even if the distance d and direction θ values can be calculated if the frequency of pattern repetition is low (that is, below a certain threshold).

Texture analysis can also be accomplished using various methods known from the literature, including using a gray level co-occurrence matrix, gray level difference statistics and a gray level runlength matrix. The image processing system according to the present embodiment is described below using a gray level co-occurrence matrix to obtain the distance d and direction θ of any image textures.

Image texture periodicity is determined using a gray level co-occurrence matrix in each of four directions θ (0, 45, 90, and 135 degrees) passing through the image center. Note that a method of determining texture periodicity and direction using a gray level co-occurrence matrix is described in detail in "Basics of image recognition II: feature extraction, edge detection, and texture analysis" (in Japanese, by Mori Shunji et al.; Ohmsha) as cited in the discussion of related technologies and the above-noted first embodiment. Further description thereof is thus omitted below.

After the attributes of texture periodicity (that is, distance d and direction θ) are calculated, it is determined whether periodicity is present in the image texture (S505).

Exemplary criteria used for this determination in the present embodiment are whether the texture pattern occurs at a regular period in at least two directions. If periodicity is detected in more than two directions, the two directions with the greatest periodicity, that is, the greatest frequency of appearance, are selected as the directions in which periodicity is present.

If periodicity is not present ("NO" in step S505), the texture extraction process terminates. If periodicity is present ("YES" in step S505), the basic texture pattern is extracted from the image based on the two directions of periodicity selected in S505 (S506). An exemplary method of extracting the basic pattern is described next.

Figure 16A:
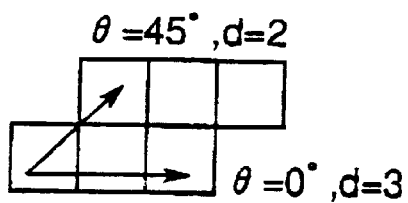
FIGS. 16A to 16D are illustrations to show basic patterns extracted based on the period and direction of an image texture pattern.

Let us assume, for example, that periodicity (direction θ, distance d) was detected at both (0°, 3) and (45°, 2) as a result of texture analysis. The basic pattern of the image texture is then extracted based on the detected directions and distances. The basic pattern in this case could be as shown in FIG. 16A.

Figure 16B:
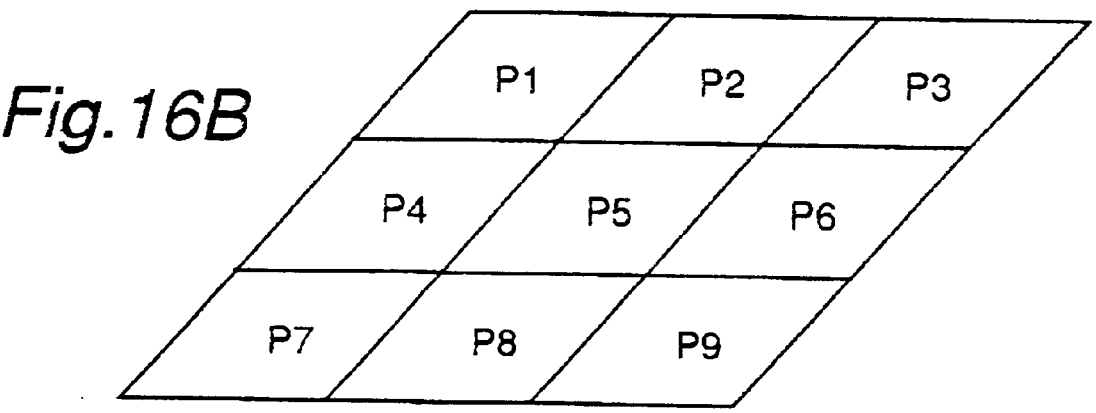

To improve the precision of the pixel values of the extracted basic pattern, the method employed in the present embodiment scans a detection area comprising nine pattern areas P1 to P9 as shown in FIG. 16B, each identical in shape and surrounding a central pattern area P5 containing the center of the image. The pixel values of the basic pattern are then determined based on the values of the pixels in each of the scanning patterns P1 to P9. The pixel values of the basic pattern are determined by a statistical process such as determining the average pixel value of all pixels at the same position in each of the scanning patterns P1 to P9, or selecting the most frequently occurring pixel value at the same position in each of the scanning patterns P1 to P9.

Figure 16C:
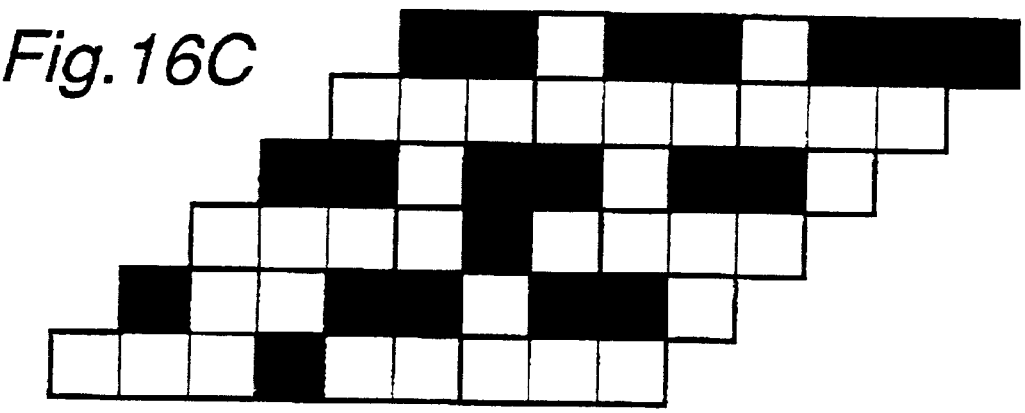
Figure 16D:

This process can be better understood with a specific example. In this example the value of each pixel in the basic pattern is determined from the values of the pixels at the same position in each of nine scanning areas as shown in FIGS. 16B and 16C. Note that the pixel value assigned to a black pixel in FIG. 16C is "1", and the pixel value of a white pixel is "0". When the value of the pixel at the right end of the top row in each scanning pattern P1 to P9 is detected (refer to FIG. 16C), the pixel value in pattern P3 is 1 (black), and the pixel value in patterns P1, P2, and P4 to P0 is 0 (white). As a result, the value of the corresponding in the basic pattern is set to 0, the most frequently occurring pixel value in the detected scanning patterns. The result of this operation on all pixels in the basic pattern area is shown in FIG. 16D for the pixel values shown in FIG. 16C.

By thus determining the pixel values of the basic pattern from an area containing a plurality of patterns, a slight amount of noise present in the area of the basic pattern candidate will be removed. An average basic pattern can also be obtained when there is distortion in the basic pattern. This distortion can occur, for example, as a result of perspective causing the near edge of a window to appear larger than the far edge of the window when the windows of a building are viewed at an angle.

After the basic pattern is extracted in step S506, the basic pattern is normalized to a predetermined size and shape (S507). This normalization converts the basic pattern to an image 32 pixels square, for example. Note that the pixel size of the normalized image must be controlled so that the texture comparison and search process (S14) can be completed quickly without losing the features of the basic pattern.

The final basic pattern is then obtained (S508) by shifting the elements of the basic pattern to the center of the normalized basic pattern image so that the features of the image are not lost. If the basic pattern is obtained as a pattern A shown in FIG. 17 after normalization (S507), for example, the elements of the basic pattern are shifted to the image center to obtain a basic pattern as a pattern B.

Comparing textures having the same basic pattern is made easier by using the basic patterns obtained by shifting the basic pattern elements to the image center. This also makes it possible to identify textures having the same basic pattern when the area where the basic pattern was extracted differs slightly in different images. A further advantage of this technique is that basic patterns are made more easily recognizable by human observers. A specific method of shifting the basic pattern elements is described in detail below.

After shifting the basic pattern elements (S508), the basic pattern and the position of the basic pattern (that is, the periodicity attributes used to extract the basic pattern at two periods) are stored as the image texture features in the image database 50 with a correlation to the image data from which the basic pattern and attributes were extracted, and the process then terminates. The image data processing apparatus according to the present embodiment thus extracts the basic texture pattern of an image as a specific image feature, and stores this feature information with the image data to the image database 50.

A specific method of shifting the basic pattern in step S508 above is described next.

Briefly, pixels with a value of 1 in the basic pattern are defined as significant pixels, and axes of rotation passing in two directions through the center of the normalized basic pattern are defined. The elements of the basic pattern are then shifted by rotation around these axes so that the moments of inertia in the axial directions of the basic pattern are minimized. This process is described more specifically below with reference to FIG. 17.

Figure 17:
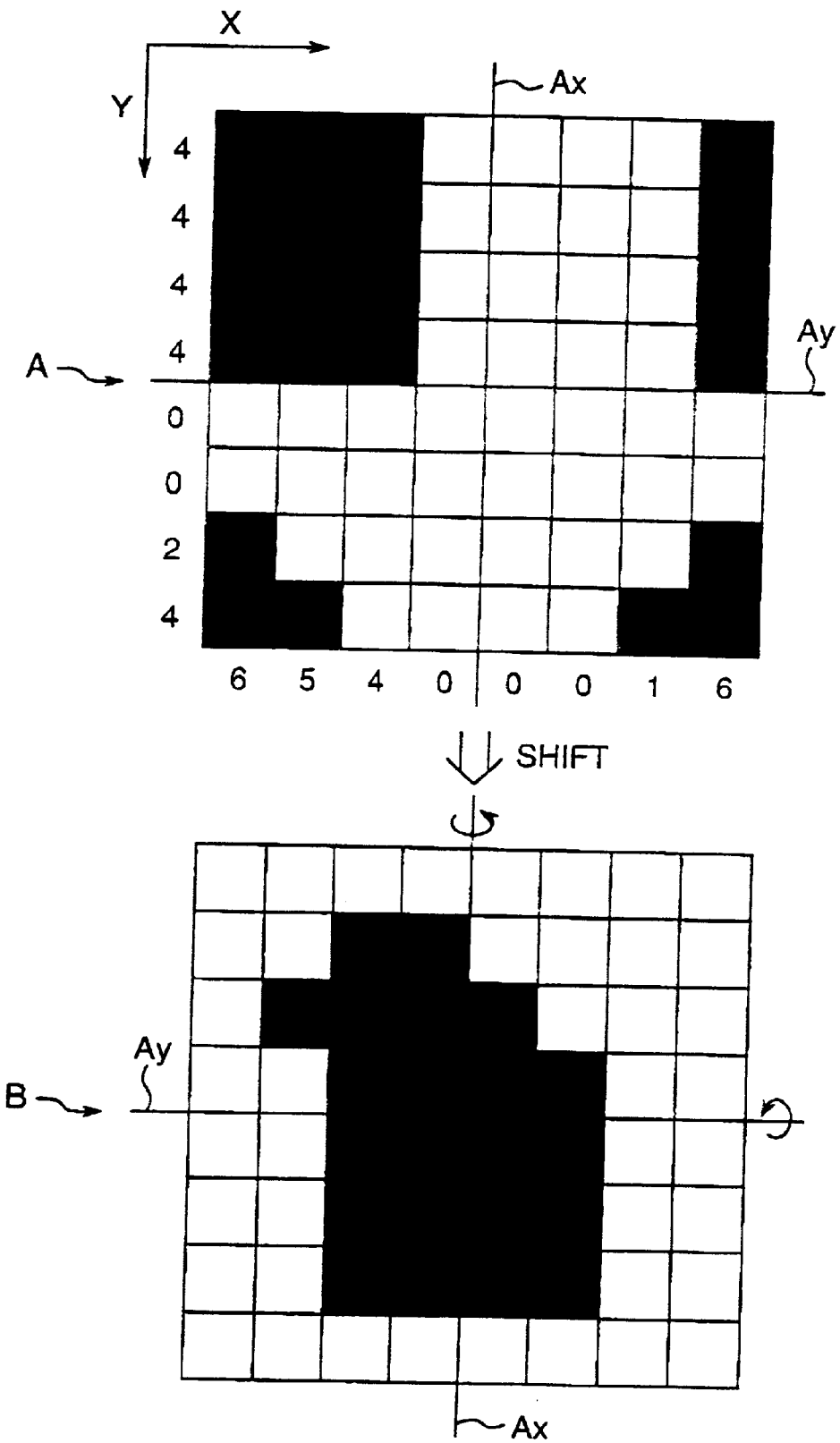
FIG. 17 is an illustration to describe a method of shifting the basic pattern.

In this example the basic pattern A is shifted to obtain the basic pattern B shown in FIG. 17. Note that the normalized size of the patterns in FIG. 17 is 8×8 pixels.

Figure 18:
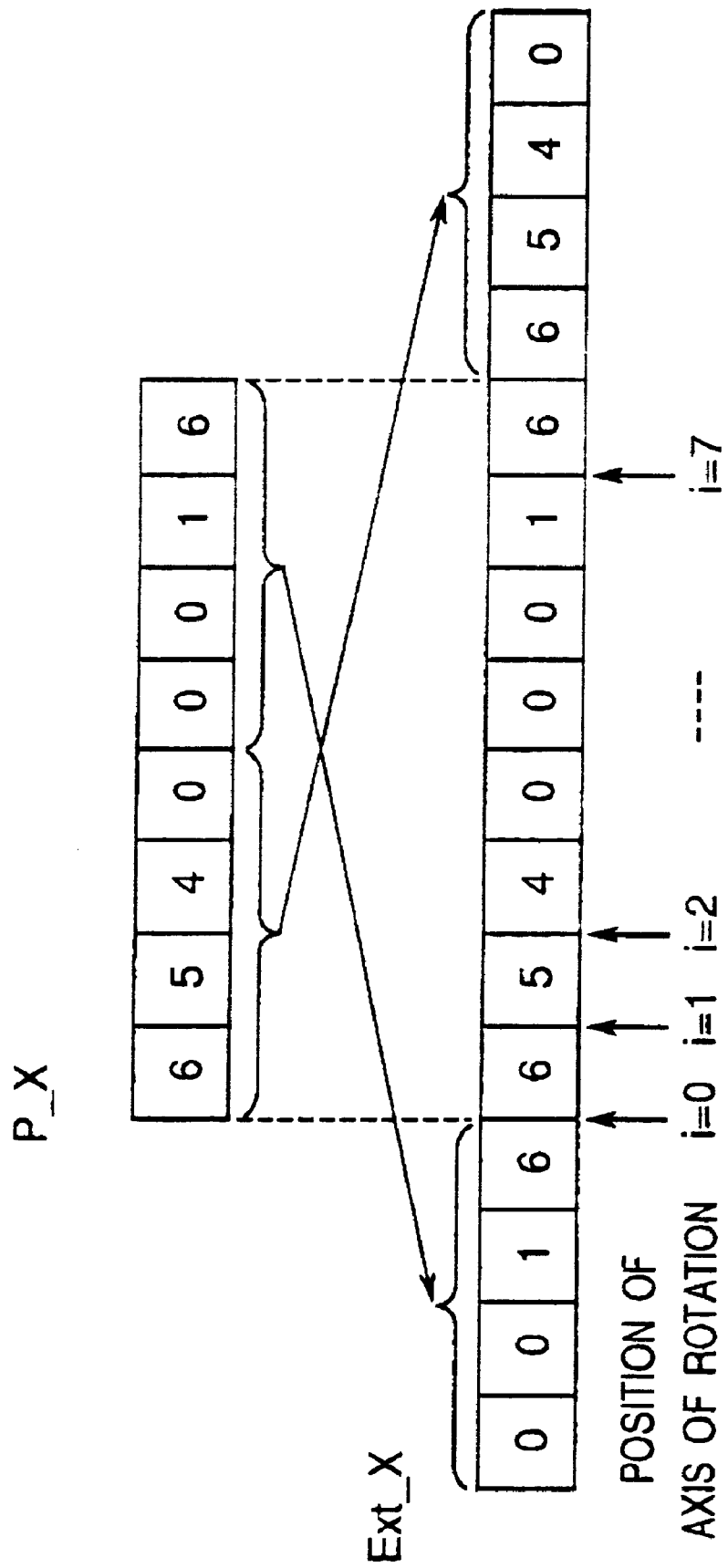
FIG. 18 is an illustration to show a data array in the X direction for obtaining the moment of inertia.

The first step is to determine the frequency of pixels with a value of 1 (that is, black pixels in this example) in both X and Y directions of the basic pattern. An array P_X representing the frequency of "1" pixels counted column-wise in the X direction is shown in FIG. 18.

The moment of inertia Ix when the basic pattern is rotated about an axis orthogonal to the X direction is then calculated as follows. The array P_X (FIG. 18) is first divided in two. The array P_X is then expanded by appending the first half of the source array P_X to the end and the second half of the source array P_X to the beginning as shown in FIG. 18. The result is the expanded array Ext_X. the moment of inertia Ix is then calculated using this expanded array Ext_X.

The moment of inertia Ix is calculated for the normalized pattern size. Because the normalized size on the X scale is 8 pixels, the data for the four pixels before and after the rotational axis are used to calculate the moment of inertia Ix. This same process is used for the Y scale.

The axis of rotation is described next. The position of the axis of rotation in the expanded array Ext_X when calculating the moment of inertia Ix depends upon whether the pixel count of the normalized image is even or odd. The method of determining the location of the axis of rotation relative to the array Ext_X is shown in FIGS. 19A and 19B for an even and an odd number of pixels in the normalized image.

Figure 19A:
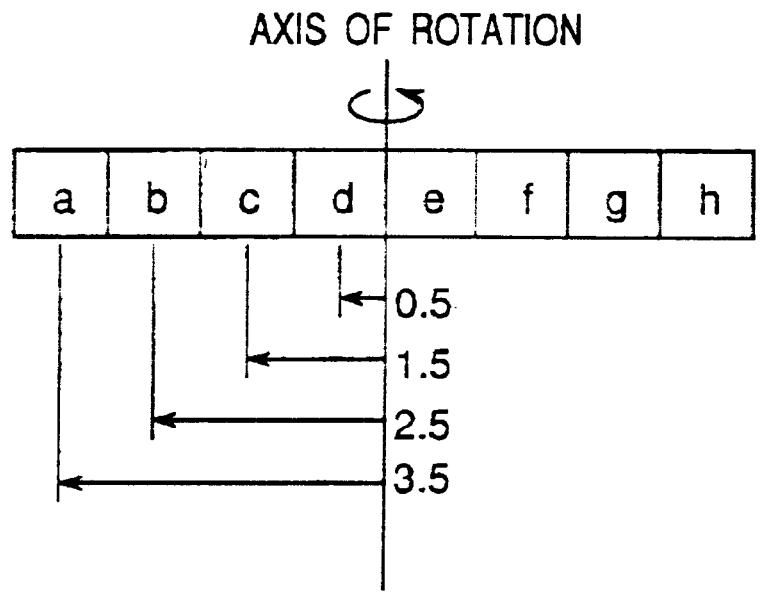
FIGS. 19A and 19B are illustrations to describe setting the axis of rotation.
Figure 19B:
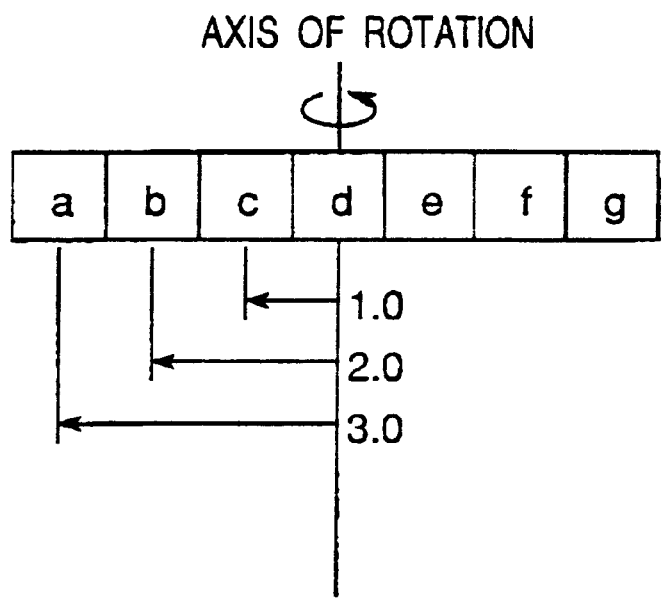

When the pixel count is even, the axis of rotation is set between columns as shown in FIG. 19A. Otherwise, when the count is odd, the axis of rotation is set at the middle of the middle column (pixel) as shown in FIG. 19B. In the case of the basic pattern shown in FIG. 18, therefore, the axis of rotation is set between columns as shown in FIG. 19A because the normalized pixel count is even.

Referring again to FIG. 18, the location i of the axis of rotation in the array Ext_X is sequentially shifted from position 0 to 7. The moment of inertia Ix as calculated at each axis of rotation to determine the location i at which the moment of inertia Ix is lowest.

After thus determining the location i of the axis of rotation at which the moment of inertia Ix is lowest on both X and Y scales, the difference between these locations and the center axes Ax and Ay of the normalized basic pattern is determined. The elements of the basic pattern are then shifted toward the center by an amount equal to the calculated differences so that the basic pattern is concentrated in the middle.

The results of calculating the moment of inertia Ix(i) are shown below. The moment of inertia Ix(i) are calculated by using the four columns of data before and after the axis of rotation when the axis of rotation is sequentially shifted through the expanded array Ext_X shown in FIG. 18. Note that (i) indicates the position of the axis of rotation along the X scale. The values for the distance from the axis of rotation used below are the value shown in FIG. 19A.

$$Ix(0) = 0 \times 3.5^2 + 0 \times 2.5^2 + 1 \times 1.5^2 + 6 \times 0.5^2 + \quad (10)$$
$$6 \times 0.5^2 + 5 \times 1.5^2 + 4 \times 2.5^2 + 0 \times 3.5^2$$
$$= 41.5$$

$$Ix(1) = 0 \times 3.5^2 + 1 \times 2.5^2 + 6 \times 1.5^2 + 6 \times 0.5^2 + \quad (11)$$
$$5 \times 0.5^2 + 4 \times 1.5^2 + 0 \times 2.5^2 + 0 \times 3.5^2$$
$$= 31.5$$

$$Ix(2) = 1 \times 3.5^2 + 6 \times 2.5^2 + 6 \times 1.5^2 + 5 \times 0.5^2 + \quad (12)$$
$$4 \times 0.5^2 + 0 \times 1.5^2 + 0 \times 2.5^2 + 0 \times 3.5^2$$
$$= 65.5$$

$$Ix(3) = 6 \times 3.5^2 + 6 \times 2.5^2 + 5 \times 1.5^2 + 4 \times 0.5^2 + \quad (13)$$
$$0 \times 0.5^2 + 0 \times 1.5^2 + 0 \times 2.5^2 + 1 \times 3.5^2$$
$$= 135.5$$

$$Ix(4) = 6 \times 3.5^2 + 5 \times 2.5^2 + 4 \times 1.5^2 + 0 \times 0.5^2 + \quad (14)$$
$$0 \times 0.5^2 + 0 \times 1.5^2 + 1 \times 2.5^2 + 6 \times 3.5^2$$
$$= 193.5$$

$$Ix(5) = 5 \times 3.5^2 + 4 \times 2.5^2 + 0 \times 1.5^2 + 0 \times 0.5^2 + \quad (15)$$
$$0 \times 0.5^2 + 1 \times 1.5^2 + 6 \times 2.5^2 + 6 \times 3.5^2$$
$$= 199.5$$

$$Ix(6) = 4 \times 3.5^2 + 0 \times 2.5^2 + 0 \times 1.5^2 + 0 \times 0.5^2 + \quad (16)$$
$$1 \times 0.5^2 + 6 \times 1.5^2 + 6 \times 2.5^2 + 5 \times 3.5^2$$
$$= 161.5$$

$$Ix(7) = 0 \times 3.5^2 + 0 \times 2.5^2 + 1 \times 1.5^2 + 1 \times 0.5^2 + \quad (17)$$
$$6 \times 0.5^2 + 6 \times 1.5^2 + 5 \times 2.5^2 + 4 \times 3.5^2$$
$$= 95.5$$

Based on the above calculations, the moment of inertia Ix is lowest when the axis of rotation is at position i=1, that is, when the axis of rotation is between column 1 and column 2 on the X scale. The difference between this axis of rotation and the center axis in this case is three pixels. Therefore, a shift by 3 pixels in the X scale direction is necessary.

Figure 20:
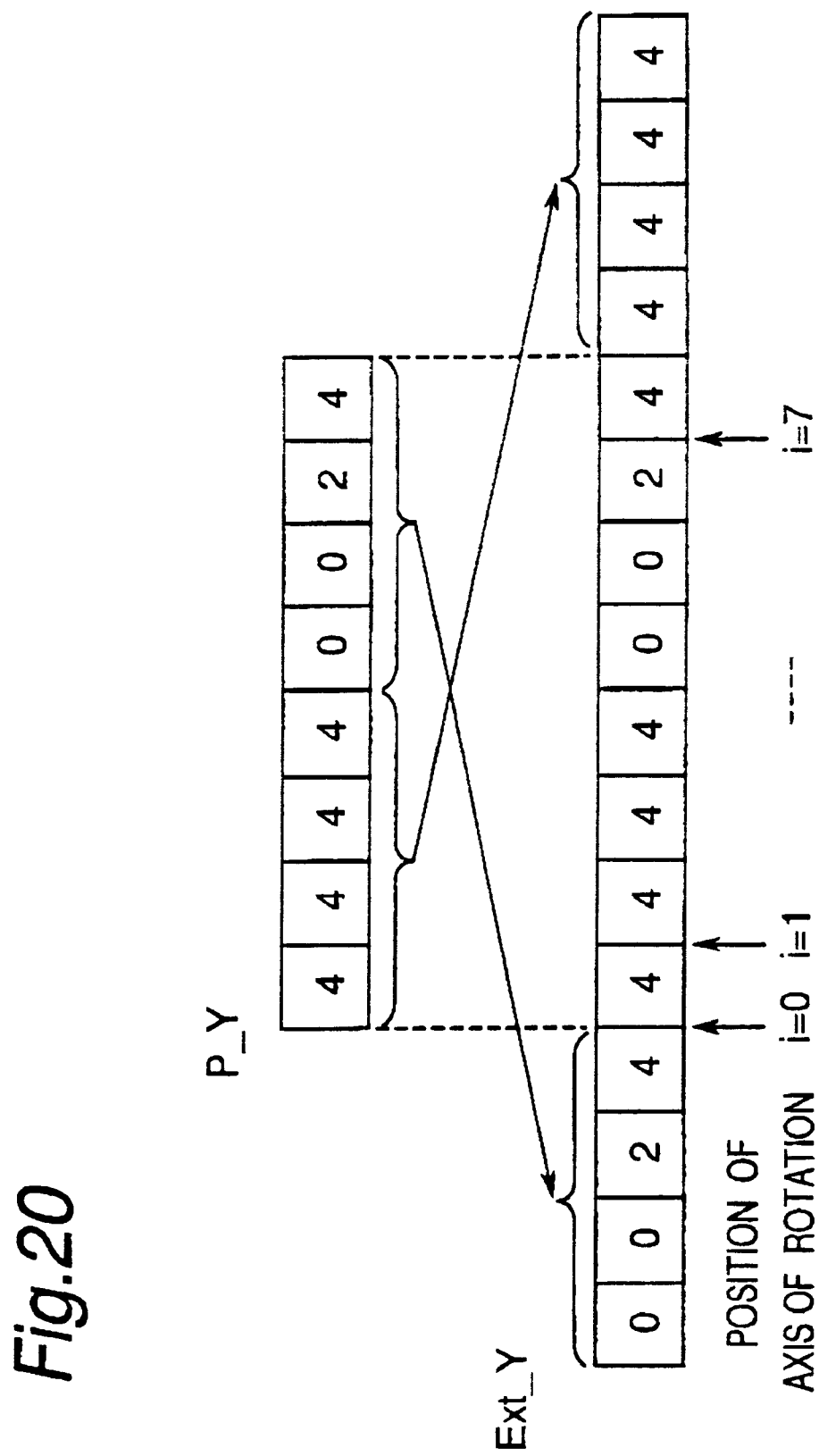
FIG. 20 is an illustration to show a data array in the Y direction for obtaining the moment of inertia.

The frequency array P_Y for pixels with a value of one counted row-wise in the Y scale direction, and the corresponding expanded array Ext_Y, are shown in FIG. 20. Similarly calculating the moment of inertia Iy(i) for positions i of 0 to 7 also indicates that the moment of inertia Iy(1) is lowest. Accordingly 3 pixel shift in the Y scale direction is therefore also necessary.

The basic pattern shown in FIG. 18 is obtained by then shifting the elements 3 pixels each toward the center on both the X and Y scales based on the above-calculated shift distances.

By thus shifting the significant image elements toward the center so that the moments of Inertia with respect to the axes through the center of the image are lowest, the basic pattern of the extracted image texture can be recognized more easily irrespective of the position from which the image was extracted.

It will be obvious that while the basic pattern is shifted toward the image center so that the moment of inertia in the image is lowest, other methods of making the basic pattern more recognizable can be alternatively used. For example, it is also possible to shift a block with the highest feature value to the center.

The texture comparison and search process (S14) is described next below with reference to the flow chart thereof in FIG. 21.

When this process is invoked, a user selects an image from an on-screen selection using a keyboard 3 or other input device for use as the search key (the "key image" below). The search engine then seeks images in the image database 50 having a basic texture feature pattern with a strong resemblance to the basic pattern of the texture features of the key image, and displays the results on the display 2.

Figure 21:
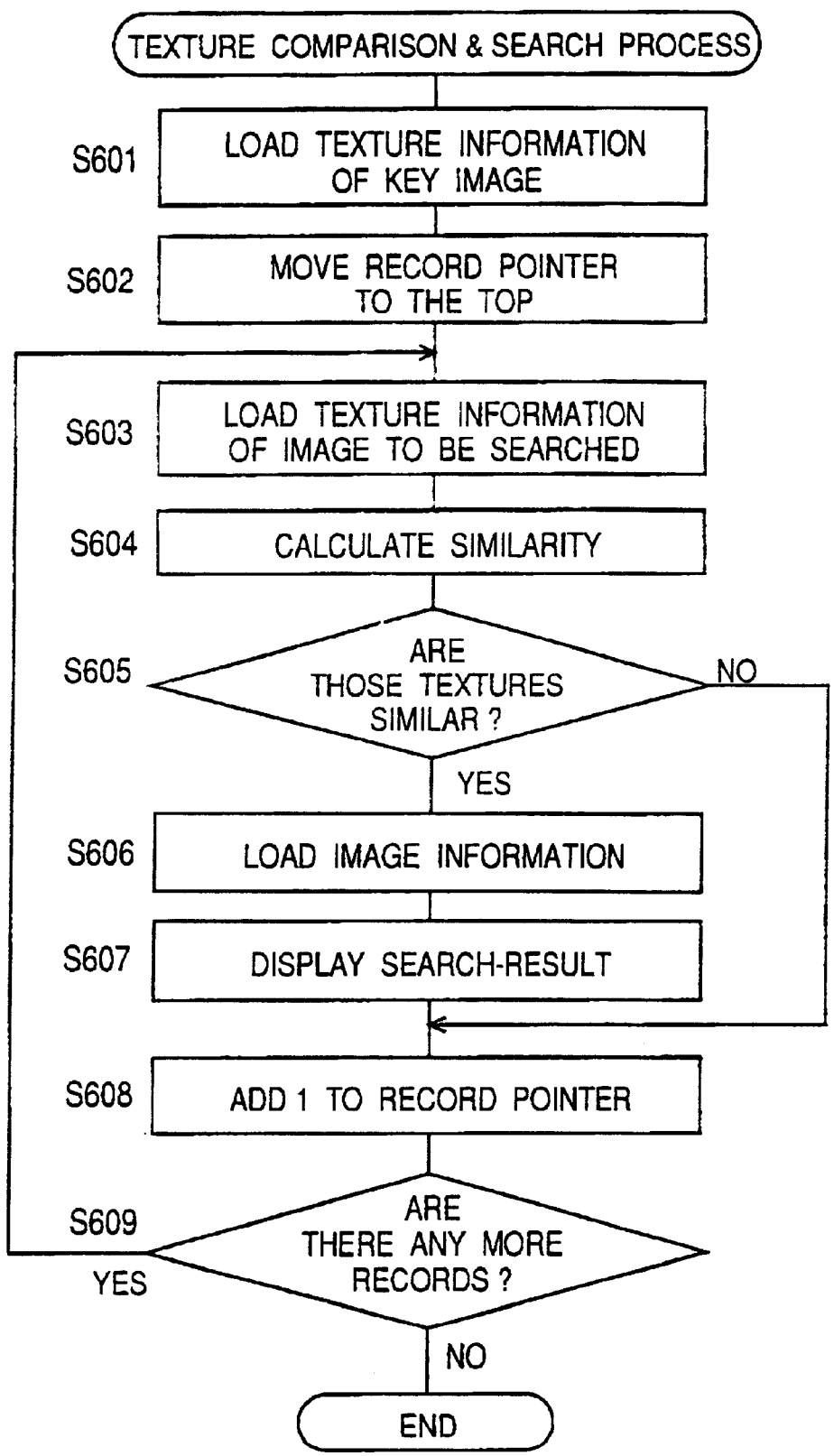
FIG. 21 is a flow chart of the texture comparison and search process of an image data processing apparatus according to the second embodiment of the invention.

Referring now to FIG. 21, the texture information of the user-selected key image is loaded from the image database 50 (S601). This texture information is stored to the image database 50 at the time the image is stored thereto. This texture information includes the basic pattern of the image texture extracted in the above-described texture extraction process (S13) and other features of the image.

The record pointer i is then moved to the top of the image database 50 being searched (S602).

The texture information of the image indicated by the record pointer i is then loaded from the image database 50 (S603). The similarity between the basic texture pattern of the key image and the basic texture pattern of the image loaded from the database is then calculated (S604). The method of calculating similarity is described further below.

Based on the calculated similarity, then, it is determined whether the image from the currently selected database record resembles the key image (S605). If not, the record pointer is incremented in step S608.

If there is a similarity ("YES" in the step S605), the image information for the current record indicated by the record pointer is loaded (S606), and the search results are displayed (S607), before incrementing the record pointer (S608).

Note that this image information can include the image data, the file name of the image data or the path to the address where the image is stored, and other image attributes.

The search results can also be displayed in various ways, including but not limited to the following: simply displaying a thumbnail image, displaying the image title or name, displaying the file name and path to the original image from which a thumbnail image is generated, and displaying the source from which the original image was obtained. It is also possible to count the number of similar images found, and display the image count.

After the record pointer is incremented (S608), it is determined whether there are any more records in the image database 50 to be compared with the key image (S609). If there are, the procedure goes back to step S603, and steps S603 to S609 are repeated until the record pointer reaches the end of the image database 50. When all records in the database 50 have been accessed and compared, the procedure ends.

The texture comparison and search process described above is both efficient and accurate for image comparisons because the basic pattern information loaded from the image database 50 can be used as without further processing for image comparisons. This is possible because the basic pattern information extracted by the texture extraction process is normalized and shifted to the image center before being stored to the database 50.

A example of calculating similarity between the key image and a comparison image in step S604 above is described below. Image similarity can be calculated by quantifying the proximity in two images between pixels with a gray level of 1. More specifically, similarity can be calculated using the three probability values P0, P1, and P2 where:

P0: probability that there is a pixel with a gray level of 1 in the comparison image at the same position as a pixel with a gray level of 1 in the key image;

P1: probability that there is a pixel with a gray level of 1 in the comparison image occupying a position adjacent to the position of a pixel with a gray level of 1 in the key image;

P2: probability that there is a pixel with a gray level of 1 in the comparison image within a urban distance of 2 from the position of a pixel with a gray level of 1 in the key image.

Using these parameters, similarity D can be calculated from the following equation:

$$D=(W0 \times P0+W1 \times P1+W2 \times P2)/(W0+W1+W2) \quad (18)$$

where W0, W1, and W2 are the weights assigned to P0, P1, and P2, respectively, and W0>W1 >W2. The greater the value of D, the greater the similarity between the two images. The value of D is therefore compared with a predetermined threshold value to determine image similarity. That is, when D is greater than a particular threshold value, the comparison image is determined to be similar to the key image.

As described above, an image data processing apparatus according to the present embodiment extracts a basic texture pattern based on the periodicity and direction of basic image elements, normalizes the extracted basic pattern, shifts the elements toward the center of the pattern, and then stores the resulting basic pattern information as an identifying feature of the source image. Images can then be compared on the basis of the basic texture patterns extracted therefrom to enable efficient image comparison and searching.

As described above, an image data processing apparatus according to the present invention can extract the basic pattern of an image texture as a distinctive feature of the source image based on the periodicity of the image texture.

An image data processing apparatus according to the present invention also normalizes the extracted basic pattern to a specific size and shape. This makes it possible to compare images of different sizes and shapes, makes it easy to determine the similarity between images, and improves the efficiency of image searching and comparison processes.

When the extracted basic pattern comprises a plurality of elements, an image data processing apparatus according to the present invention shifts those elements as much as possible to the image center while retaining the features of the basic pattern. The resulting basic pattern is therefore easier to recognize, and the efficiency of image searching and comparison processes is improved.

When searching for an image similar to a key image, an image data processing apparatus according to the present invention can also easily compare and determine whether two images are similar by evaluating image similarity based on the basic texture pattern extracted from the image. These processes can also be completed quickly and accurately by using the basic pattern information resulting from normalization to a specific size and shape, and shifting the basic pattern elements toward the image center.

Although the present invention has been described in connection with the preferred embodiments thereof with reference to the accompanying drawings, it is to be noted that various changes and modifications will be apparent to those skilled in the art. Such changes and modifications are to be understood as included within the scope of the present invention as defined by the appended claims, unless they depart therefrom.

What is claimed is:

1. An image data processing apparatus for processing image data of an image containing texture, said image data processing apparatus comprising:

a texture extraction controller for obtaining feature information relating to said texture from said image data;

a memory for storing image data and the feature information extracted by the texture extraction controller from the image data, said feature information being stored as pattern information and a lowest value of inertia of a gray level co-occurrence matrix; and a comparison controller for comparing images based on the feature information stored to said memory.

2. The image data processing apparatus according to claim 1, wherein said feature information includes a basic pattern of a texture in the image, and arrangement information relating to a position of the basic pattern in the texture.

3. The image data processing apparatus according to claim 2, wherein said basic pattern is detected based on periodicity in two directions in the image, and said arrangement information includes the period in these two directions.

4. The image data processing apparatus according to claim 2, wherein the basic pattern is extracted such that significant pixels constituting the basic pattern are concentrated in a center part of the image.

5. The image data processing apparatus according to claim 1, further comprising an input means for selecting an image to be used as a search key, wherein said comparison controller searches for image data similar to the image selected by said input means by sequentially comparing the feature information for said selected image by said input means with the feature information of one or more images stored to said memory, based on a similarity between both feature information.

6. An image data processing apparatus for processing image data of an image containing a texture formed by a basic pattern repeating at a specific period, said image data processing apparatus comprising:

a detection controller for detecting feature information relating to the basic pattern of the texture and to arrangement of the basic pattern based on the image data;

a memory for storing image data and the feature information detected from the image data by said detection controller, said feature information being stored as pattern information and a lowest value of inertia of a gray level co-occurrence matrix; and a comparison controller for comparing images based on the feature information stored to said memory.

7. The image data processing apparatus according to claim 6, wherein said detection controller detects periodicity in the image in two directions, and the arrangement information relates to the detected period and direction.

8. The image data processing apparatus according to claim 7, wherein the detection controller detects a basic pattern based on the detected periodicity in two directions.

9. The image data processing apparatus according to claim 6, wherein the basic pattern is detected such that significant pixels constituting the basic pattern are concentrated in a center of the image.

10. The image data processing apparatus according to claim 6, further comprising an input means for selecting an image to be used as a search key, wherein said comparison controller searches for image data similar to the image selected by said input means by sequentially comparing feature information for said selected image by said input means with the feature information of one or more images stored to said memory, based on a similarity between both feature information.

11. An image data processing apparatus for processing image data of an image containing a texture formed by a basic pattern repeating at a specific period, said image data processing apparatus comprising:

an image database for storing image data for a plurality of images and feature information comprising a basic pattern and period of a texture in the image, said feature information being stored as pattern information and a lowest value of inertia of a gray level co-occurrence matrix;

an input means for selecting an image to be used as a search key for seeking a desired image data from the image database; and a controller for determining a similarity between the image selected by said input means and the image stored in said image database by sequentially comparing the feature information for the image selected by said input means with the feature information stored in the image database, and seeking a desired image from said image database based on said similarity.

12. The image data processing apparatus according to claim 11, wherein the period of the feature information comprises periods in two directions in the image.

13. The image data processing apparatus according to claim 11, further comprising:

an image data generator for generating image data to be stored to said image database; and a database entry controller for extracting feature information from image data generated by said image data generator, and registering said extracted feature information with the image data in said image database.

14. A computer program product in a memory, said computer program product comprising:

a period detection control for detecting a period at which a basic pattern repeats in an image band of a defined width within an image containing a texture formed by a basic pattern that repeats at a specific period based on image data for said image; and an extraction control for extracting the basic pattern of the texture in said image and the location of said basic pattern based on the period detected in the image band by said period detection step, wherein said period detection control and extraction control based upon a lowest value of inertia of a gray level co-occurrence matrix.

15. The computer program product in a memory according to claim 14, further comprising:

a storage control for storing image data and feature information detected by said extraction control to an image database, said image data and said feature information being stored with a defined relationship therebetween; and a search control for seeking a desired image in said image database based on the feature information.

16. A computer program product in a memory, said computer program product comprising:

an input control for entering a search key used to seek a desired image from an image database, said image database storing image data for a plurality of images and image feature information related to said image, said feature information relating to a basic pattern of an image texture in the associated image and to a lowest value of inertia of a gray level co-occurrence matrix; and a search control for seeking an image in said image database similar to the image selected as the search key by referencing the feature information.

17. The computer program product in a memory according to in claim 16, wherein said input control selects desired image and the feature information for said selected image is said search key.

18. An image data processing method comprising:

a detecting step for detecting a period of basic pattern repetition in an image band of a defined width of an image containing a texture pattern formed by a basic pattern repeating periodically; and an extracting step for extracting the basic pattern and arrangement information thereof from said image data as feature information indicative of image features based on the period of basic pattern repetition detected in the image band by said detecting step, wherein said detecting step and said extracting step based upon a lowest value of inertia of a gray level co-occurrence matrix.

19. The image data processing method according to claim 18, further comprising:

a storing step for storing image data and feature information extracted by said extracting step with a relationship therebetween in an image database; and a searching step for searching a desired image from said image database based on said feature information.

20. An image data processing method comprising:

a selecting step for selecting a search key used to seek a desired image from an image database; and a searching step for seeking an image in said image database similar to the image selected as the search key by referencing the feature information, said image database storing image data for a plurality of images and feature information for said images, said feature information being stored as pattern information and a lowest value of inertia of a gray level co-occurrence matrix, said feature information relating to a basic pattern of a texture in the associated image.

21. The image data processing method according to claim 20, wherein the feature information for an image selected by said selecting step is the search key.

22. An image data processing apparatus for processing image data for an image, said image having a matrix pattern consisting of a plurality of pixels and a texture pattern, said image data processing apparatus comprising an extraction controller for extracting feature information indicative of a texture using pixel data for pixels located only within a particular area of the image, said particular area being a scanning band oriented in a predetermined direction through the image, the scanning band being a line or a band of a predetermined width, wherein said feature information based upon a lowest value of inertia of a gray level co-occurrence matrix.

23. The image data processing apparatus according to claim 22, wherein said extraction controller comprises:

a calculation means for calculating a gray level co-occurrence matrix for an image texture using pixel data for pixels located in a scanning band oriented in a predetermined direction through the image, the scanning band being a line or a band of a specific width; and an extraction means for detecting image periodicity based on calculated results from said calculation means, and extracting said detected periodicity as an image feature.

24. The image data processing apparatus according to claim 22, further comprising a digitizing means for digitizing gradation data of multiple gradation levels, wherein the extraction means processes image data digitized by said digitizing means.

25. The image data processing apparatus according to claim 24, wherein said digitizing means digitizes using a value offset from a median value of a gradation distribution of pixels in said image data.

26. An image data processing method for processing image data for an image, said image having a matrix pattern consisting of a plurality of pixels and a texture pattern, said image data processing apparatus comprising an extracting step for extracting feature information indicative of a texture using pixel data for pixels located only within a particular area of the image, the particular area being a scanning band oriented in a predetermined direction through the image, the scanning band being a line or a band of a predetermined width, wherein said feature information based upon a lowest value of inertia of a gray level co-occurrence matrix.

27. The image data processing method according to claim 26, wherein said extracting step comprises a calculating step for calculating a gray level co-occurrence matrix for an image texture using pixel data for pixels located in a scanning band oriented in a predetermined direction through the image, said scanning band being a line or a band of a predetermined width; and a step for detecting image periodicity based on calculated results from said calculating step, and extracting the detected periodicity as a feature of image.

28. The image data processing method according to claim 26, further comprising a digitizing step for digitizing gradation data of multiple gradation levels, wherein said extracting step processes image data digitized by said digitizing step.

29. The image data processing method according to claim 28, wherein said digitizing step digitizes using a value offset from a median value of a gradation distribution of image data pixels.

30. A computer program product in a memory for processing image data for an image, said image consisting of a plurality of pixels arranged in a matrix pattern and having a texture pattern, said computer program product comprising an extraction control for extracting feature information indicative of an image texture using pixel data for pixels located only within a particular area of the image, the particular area being a scanning band oriented in a predetermined direction through the image, the scanning band being a line or a band of a predetermined width, wherein said feature information based upon a lowest value of inertia of a gray level co-occurrence matrix.

31. The computer program product according to claim 30, wherein the extraction control further comprises:

a calculation control for calculating a gray level co-occurrence matrix for an image texture using pixel data for pixels located in a scanning band oriented in a predetermined direction through the image, the scanning band being a line or a band of a predetermined width; and a extraction control for detecting image periodicity based on calculated results from said calculation control, and extracting the detected periodicity as an image feature.

32. The computer program product according to claim 30, further comprising a digitizing control for digitizing gradation data of multiple gradation levels, wherein said extraction control processes image data digitized by said digitizing control.

33. The computer program product according to claim 32, wherein said digitizing control digitizes using a value offset from a median value of a gradation distribution of image data pixels.

* * * * *